US012520871B2

(12) United States Patent
Lau et al.

(10) Patent No.: US 12,520,871 B2
(45) Date of Patent: *Jan. 13, 2026

(54) NON-NICOTINE E-VAPING DEVICE WITH INTEGRAL HEATER-THERMOCOUPLE

(71) Applicant: Altria Client Services LLC, Richmond, VA (US)

(72) Inventors: Raymond W. Lau, Richmond, VA (US); Eric Hawes, Midlothian, VA (US)

(73) Assignee: Altria Client Services LLC, Richmond, VA (US)

( * ) Notice: Subject to any disclaimer, the term of this patent is extended or adjusted under 35 U.S.C. 154(b) by 768 days.

This patent is subject to a terminal disclaimer.

(21) Appl. No.: 16/929,475

(22) Filed: Jul. 15, 2020

(65) Prior Publication Data
US 2022/0015426 A1 Jan. 20, 2022

(51) Int. Cl.
*A24F 40/46* (2020.01)
*A24F 40/10* (2020.01)
(Continued)

(52) U.S. Cl.
CPC ............... *A24F 40/46* (2020.01); *A24F 40/10* (2020.01); *A24F 40/42* (2020.01); *A24F 40/44* (2020.01);
(Continued)

(58) Field of Classification Search
CPC .......... A24F 40/10; A24F 40/46; A24F 40/42; A24F 42/60; A24F 40/95
See application file for complete search history.

(56) References Cited

U.S. PATENT DOCUMENTS 3,789,190 A 1/1974 Orosy et al.
4,915,508 A 4/1990 McCulloch et al.
(Continued)

FOREIGN PATENT DOCUMENTS

CN 203851801 U 10/2014
CN 10-4132742 A 11/2014
(Continued)

OTHER PUBLICATIONS

Watlow, "Tubular Heaters Heat Up the Foodservice Industry," retrieved Dec. 16, 2016 from URL: http://www.watlow.com/-/media/Documents/Specification-Sheets/hanfth0807.ashx, 2007.
(Continued)

*Primary Examiner* — Michael H. Wilson
*Assistant Examiner* — Stephanie Lynn Moore
(74) *Attorney, Agent, or Firm* — HARNESS, DICKEY & PIERCE, P.L.C.

(57) ABSTRACT

A non-nicotine e-vaping device may include a device body configured to receive a non-nicotine cartridge. The non-nicotine cartridge includes a non-nicotine pre-vapor formulation, a wick, and an integral heater-thermocouple. The wick is configured to transport the non-nicotine pre-vapor formulation by capillary action. The integral heater-thermocouple includes a first segment made of a first alloy and a second segment made of a second alloy. The device body includes a power supply, at least one sensor, and a controller. The power supply is configured to deliver electrical energy to the integral heater-thermocouple to heat the non-nicotine pre-vapor formulation to generate a non-nicotine vapor. The at least one sensor is configured to measure a voltage difference between the first segment and the second segment of the integral heater-thermocouple during such heating. The controller is configured to adjust the electrical energy to the
(Continued)

integral heater-thermocouple based on the measured voltage difference.

17 Claims, 20 Drawing Sheets

(51) Int. Cl.
    *A24F 40/42*     (2020.01)
    *A24F 40/44*     (2020.01)
    *A24F 40/485*    (2020.01)
    *A24F 40/51*     (2020.01)
    *A24F 40/57*     (2020.01)
    *A61M 15/06*    (2006.01)
    *H05B 1/02*     (2006.01)
    *H05B 3/06*     (2006.01)

(52) U.S. Cl.
    CPC ............ *A24F 40/485* (2020.01); *A24F 40/51* (2020.01); *A24F 40/57* (2020.01); *H05B 1/0297* (2013.01); *H05B 3/06* (2013.01); *A61M 15/06* (2013.01); *A61M 2205/3673* (2013.01); *H05B 2203/037* (2013.01)

(56) References Cited

U.S. PATENT DOCUMENTS

| | | | |
|---|---|---|---|
| 6,034,360 | A | 3/2000 | Karlsson |
| 6,054,678 | A | 4/2000 | Miyazaki |
| 6,104,011 | A | 8/2000 | Juliano |
| 9,040,875 | B2 | 5/2015 | Naidu et al. |
| 2014/0109905 | A1 | 4/2014 | Yamada et al. |
| 2014/0338685 | A1 | 11/2014 | Amir |
| 2016/0150825 | A1 | 6/2016 | Mironov et al. |
| 2016/0213065 | A1* | 7/2016 | Wensley ................. H05B 3/16 |
| 2016/0235122 | A1 | 8/2016 | Krietzman |
| 2016/0306789 | A1 | 10/2016 | Cougias et al. |
| 2017/0224014 | A1* | 8/2017 | Fraser ................... A24F 40/485 |
| 2017/0325507 | A1 | 11/2017 | Xiang |
| 2017/0325510 | A1 | 11/2017 | Hu et al. |
| 2017/0340003 | A1* | 11/2017 | Batista ................. A24B 15/167 |
| 2018/0045580 | A1 | 2/2018 | Merrikh et al. |
| 2018/0077967 | A1 | 3/2018 | Hatton et al. |
| 2022/0175042 | A1* | 6/2022 | Moloney ................. A24F 40/42 |

FOREIGN PATENT DOCUMENTS

| | | |
|---|---|---|
| CN | 111150109 A | 5/2020 |
| DE | 10-2008-053494 A1 | 4/2010 |
| JP | 2019-530447 A | 10/2019 |
| WO | WO-2015/026948 A1 | 2/2015 |
| WO | WO-2015/172224 A1 | 11/2015 |
| WO | 2020/075139 A1 | 4/2020 |
| WO | WO-2021/009483 A1 | 1/2021 |

OTHER PUBLICATIONS

Written Opinion for PCT Application No. PCT/EP2021/069835 dated Jun. 14, 2022.
International Search Report and Written Opinion for PCT/EP2021/069835 dated Oct. 22, 2021.
International Search Report and Written Opinion for PCT/US2021/037583 dated Oct. 25, 2021.
U.S. Office Action for corresponding U.S. Appl. No. 16/929,527 issued on Sep. 13, 2022.
International Preliminary Report on Patentability for PCT Application No. PCT/EP2021/069835 dated Oct. 25, 2022.
U.S. Office Action for corresponding U.S. Appl. No. 16/929,527 issued on Feb. 7, 2023.
International Preliminary Report on Patentability for PCT Application No. PCT/US2021/037583 dated Jan. 26, 2023.
U.S. Office Action for corresponding U.S. Appl. No. 16/929,527 issued on Jun. 13, 2023.
European Office Action for European Patent Application No. 21743514.8 dated Nov. 8, 2023.
European Notice of Allowance for corresponding European Patent Application No. 21743514.8 dated May 2, 2024.
European Notice of Allowance for corresponding European Patent Application No. 21740331.0 dated Apr. 7, 2025.
Japanese Office Action issued in Application No. 2023-502668, dated Apr. 30, 2025, with English translation.

* cited by examiner

500

500

NON-NICOTINE E-VAPING DEVICE WITH INTEGRAL HEATER-THERMOCOUPLE

BACKGROUND

Field

The present disclosure relates to temperature measurement and control in non-nicotine electronic vaping (e-vaping) devices.

Description of Related Art

Some non-nicotine e-vaping devices include a first section coupled to a second section. The first section may include a wick and a heater. The wick is configured to move a non-nicotine pre-vapor formulation via capillary action and is positioned so as to extend into a reservoir and a vapor passage. The heater is in thermal contact with the wick and is configured to vaporize the non-nicotine pre-vapor formulation drawn via the wick into the vapor passage. The second section includes a power source configured to supply an electric current to the heater during vaping. The initiation of the operation of the non-nicotine e-vaping device may be achieved through manual- and/or puff-activation.

SUMMARY

At least one embodiment relates to a non-nicotine cartridge for a non-nicotine e-vaping device. In an example embodiment, the non-nicotine cartridge may include a housing, a wick, and an integral heater-thermocouple. The housing defines a reservoir containing a non-nicotine pre-vapor formulation. The wick is configured to transport the non-nicotine pre-vapor formulation by capillary action. The integral heater-thermocouple is configured to heat the non-nicotine pre-vapor formulation in the wick to generate a non-nicotine vapor. The integral heater-thermocouple includes a first segment made of a first alloy and a second segment made of a second alloy.

At least one embodiment relates to a non-nicotine e-vaping device. In an example embodiment, the non-nicotine e-vaping device may include a non-nicotine cartridge and a device body. The non-nicotine cartridge includes a non-nicotine pre-vapor formulation, a wick, and an integral heater-thermocouple. The wick is configured to transport the non-nicotine pre-vapor formulation by capillary action. The integral heater-thermocouple includes a first segment made of a first alloy and a second segment made of a second alloy. The device body is configured to receive the non-nicotine cartridge. The device body includes a power supply, at least one sensor, and a controller. The power supply is configured to deliver a supply of electrical energy to the integral heater-thermocouple to heat the non-nicotine pre-vapor formulation in the wick to generate a non-nicotine vapor. The at least one sensor is configured to measure a voltage difference between the first segment and the second segment of the integral heater-thermocouple as a result of the supply of the electrical energy from the power supply. The controller is configured to adjust the supply of the electrical energy to the integral heater-thermocouple based on the voltage difference measured by the at least one sensor.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
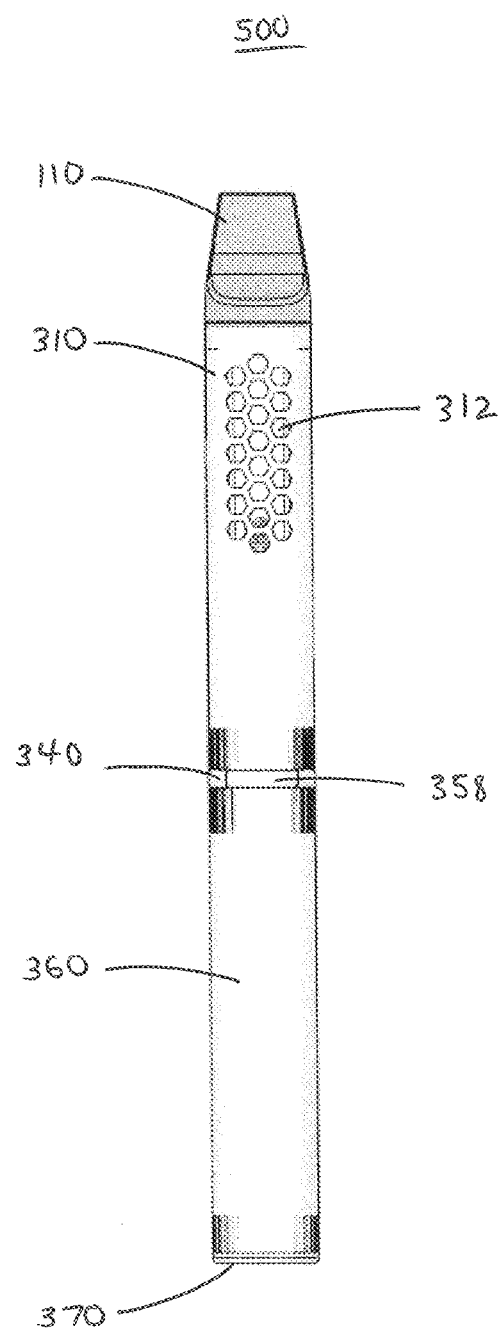
FIG. 1 is a front view of a non-nicotine e-vaping device according to an example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives thereof. Like numbers refer to like elements throughout the description of the figures.

It should be understood that when an element or layer is referred to as being "on," "connected to," "coupled to," "attached to," "adjacent to," or "covering" another element or layer, it may be directly on, connected to, coupled to, attached to, adjacent to or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations or sub-combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, and/or elements, but do not preclude the presence or addition of one or more other features, integers, steps, operations, elements, and/or groups thereof.

When the terms "about" or "substantially" are used in this specification in connection with a numerical value, it is intended that the associated numerical value includes a manufacturing or operational tolerance (e.g., ±10%) around the stated numerical value. Moreover, when the terms "generally" or "substantially" are used in connection with geometric shapes, it is intended that precision of the geometric shape is not required but that latitude for the shape is within the scope of the disclosure. Furthermore, regardless of whether numerical values or shapes are modified as "about," "generally," or "substantially," it will be understood that these values and shapes should be construed as including a manufacturing or operational tolerance (e.g., ±10%) around the stated numerical values or shapes.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Hardware may be implemented using processing or control circuitry such as, but not limited to, one or more processors, one or more Central Processing Units (CPUs), one or more microcontrollers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In the following description, illustrative embodiments may be described with reference to acts and symbolic representations of operations (e.g., in the form of flow charts, flow diagrams, data flow diagrams, structure diagrams, block diagrams, etc.) that may be implemented as program modules or functional processes including routines, programs, objects, data structures, etc., that perform particular tasks or implement particular abstract data types. The operations be implemented using existing hardware in existing electronic systems, such as one or more microprocessors, Central Processing Units (CPUs), digital signal processors (DSPs), application-specific-integrated-circuits (ASICs), SoCs, field programmable gate arrays (FPGAs), computers, or the like.

One or more example embodiments may be (or include) hardware, firmware, hardware executing software, or any combination thereof. Such hardware may include one or more microprocessors, CPUs, SoCs, DSPs, ASICs, FPGAs, computers, or the like, configured as special purpose machines to perform the functions described herein as well as any other well-known functions of these elements. In at least some cases, CPUs, SoCs, DSPs, ASICs and FPGAs may generally be referred to as processing circuits, processors and/or microprocessors.

Although processes may be described with regard to sequential operations, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium," may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, at least some portions of example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, processor(s), processing circuit(s), or processing unit(s) may be programmed to perform the necessary tasks, thereby being transformed into special purpose processor(s) or computer(s).

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

FIG. 1 is a front view of a non-nicotine e-vaping device according to an example embodiment. Referring the FIG. 1, a non-nicotine e-vaping device 500 may include a sleeve section 310 configured to receive a non-nicotine cartridge 100 (discussed in more detail below with respect to FIG. 6). The sleeve section 310 is connected to a battery section housing 360 via a knurled connector 340. A light pipe 358 may be exposed by the knurled connector 340 such that the exposed surface of the light pipe 358 constitutes an external surface of the non-nicotine e-vaping device 500. The exposed surface of the light pipe 358 may also be between the sleeve section 310 and the battery section housing 360. The combination of at least the sleeve section 310 and the battery section housing 360 may be collectively regarded as the device housing of the non-nicotine e-vaping device 500. When the non-nicotine e-vaping device 500 is fully assembled/engaged, a mouthpiece 110 is disposed at the proximal end of the sleeve section 310, while an end cap 370 is disposed at the distal end of the battery section housing 360. The mouthpiece 110 may have a tapered form such that the width at its proximal end is less than the diameter of the sleeve section 310.

The proximal end and the distal end of the non-nicotine e-vaping device 500 (and/or its constituent parts) may also be referred to as the downstream end and the upstream end, respectively. In particular, as used herein, "proximal" (and, conversely, "distal") is in relation to an adult vaper during vaping, and "downstream" (and, conversely, "upstream") is in relation to a flow of the non-nicotine vapor.

The sleeve section 310 defines a plurality of air inlets 312. As illustrated, each of the air inlets 312 may have a hexagonal shape and may be arranged in a staggered array so as to resemble a honeycomb pattern. However, it should be understood that other shapes and arrangements are possible. For instance, in lieu of (or in addition to) a hexagonal shape, the air inlets 312 may include triangular, quadrilateral (e.g., square, diamond), pentagonal, and/or circular shapes. Furthermore, instead of an axial arrangement along a partial length of the sleeve section 310, the air inlets 312 may be arrayed in a circumferential arrangement around the sleeve section 310. In an example embodiment, the non-nicotine e-vaping device 500 may include at least ten total air inlets 312 (e.g., at least twenty total air inlets 312).

Figure 2:
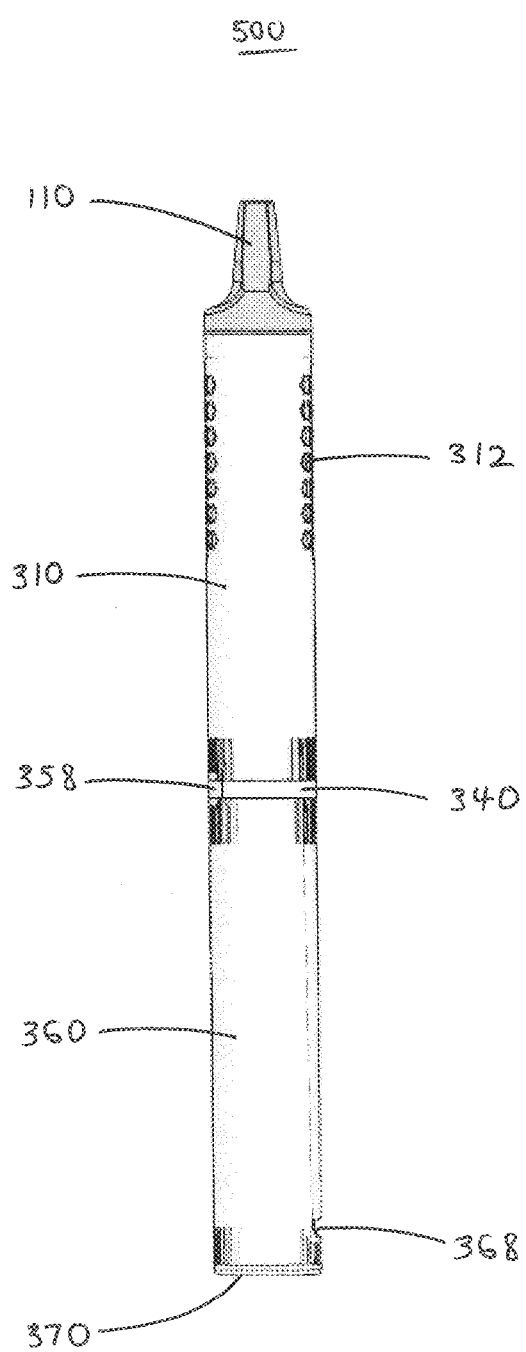
FIG. 2 is a side view of the non-nicotine e-vaping device of FIG. 1.
Figure 3:
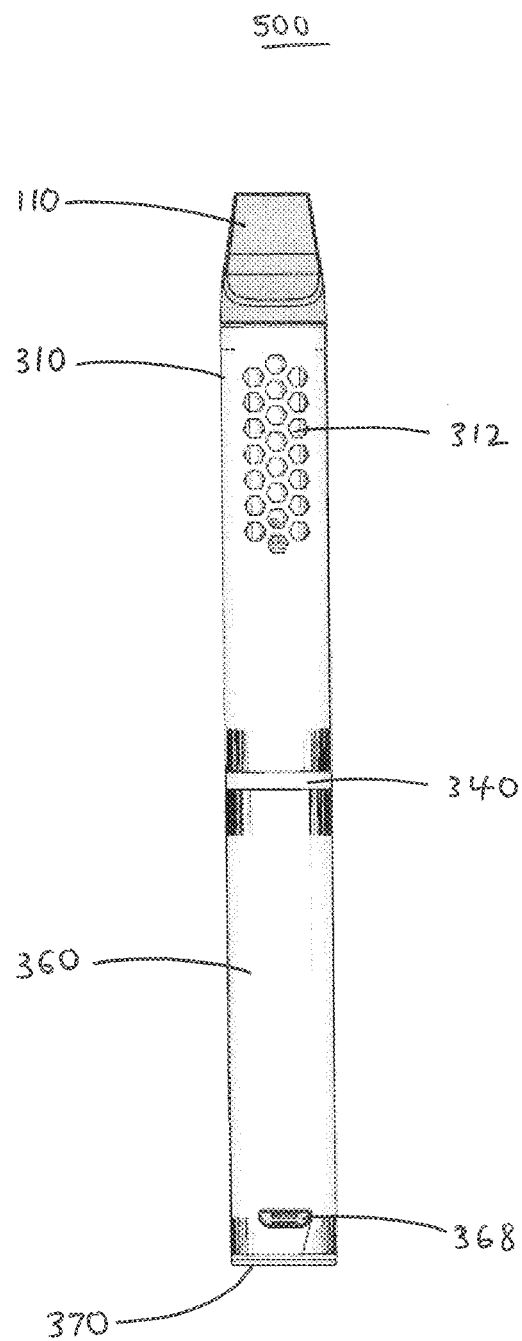
FIG. 3 is a rear view of the non-nicotine e-vaping device of FIG. 1.

FIG. 2 is a side view of the non-nicotine e-vaping device of FIG. 1. Referring to FIG. 2, opposite sides of the sleeve section 310 may define a first array of the air inlets 312 and a second array of the air inlets 312 such that both arrays are partially visible in the side view. In an example embodiment, the first array of the air inlets 312 is fully visible based on a front view of the sleeve section 310 as shown in FIG. 1, while the second array of the air inlets 312 is fully visible based on a rear view of the sleeve section 310 as shown in FIG. 3, which is discussed below.

The mouthpiece 110 may have a wedge-like or chisel-like appearance based on the side view of FIG. 2. However, it should be understood that other shapes and configurations are possible. For example, in one instance, the mouthpiece 110 may instead have a cylindrical form. In another instance, the mouthpiece 110 may have a frustoconical form or shape of a truncated cone.

A port 368 may be disposed near the distal end of the battery section housing 360 so as to be adjacent to the end cap 370. In the side view of FIG. 2, the port 368 may be visible as just a recess in the battery section housing 360. In an example embodiment, the port 368 facilitates the charging of and/or communication of information to/from the non-nicotine e-vaping device 500. The port 368 will be discussed in more detail in connection with FIG. 3.

The light pipe 358 is configured to transmit light emitted from at least one internal light source (e.g., LED) so as to provide one or more visual indications. In particular, the light transmitted by the light pipe 358 may visually notify an adult vaper of a state of the non-nicotine e-vaping device 500. For instance, the visual indications by the light pipe 358 may include (but are not limited to) the following information: whether the non-nicotine e-vaping device 500 is on, whether non-nicotine vapor is being generated, whether the battery is low, whether charging is taking place or completed, and/or whether the non-nicotine pre-vapor formulation is low or depleted.

As referred to herein, a non-nicotine pre-vapor formulation is a material or combination of materials that is devoid of nicotine and that may be transformed into a non-nicotine vapor. For example, the non-nicotine pre-vapor formulation may include a liquid, solid, and/or gel formulation. These may include, for example and without limitation, solutions and suspensions (e.g., emulsions) containing water, oil, beads, solvents, active ingredients, ethanol, plant extracts, non-nicotine compounds, natural or artificial flavors, vapor formers such as glycerin and propylene glycol, and/or any other ingredients that may be suitable for vaping. During vaping, the non-nicotine e-vaping device 500 is configured to heat the non-nicotine pre-vapor formulation to generate a non-nicotine vapor. Non-nicotine vapor, non-nicotine aerosol, and non-nicotine dispersion can be used interchangeably and refer to the matter generated or outputted by the devices disclosed, claimed, and/or equivalents thereof, wherein such matter is devoid of nicotine.

Referring back to FIG. 2, the light pipe 358 may be on an opposite side of the non-nicotine e-vaping device 500 from the port 368. However, it should be understood that example embodiments are not limited thereto. For instance, in some embodiments, the light pipe 358 may be on the same side of the non-nicotine e-vaping device 500 as the port 368 (e.g., rear side of the non-nicotine e-vaping device 500). Conversely, in other embodiments, the port 368 may be on the same side of the non-nicotine e-vaping device 500 as the light pipe 358 (e.g., front side of the non-nicotine e-vaping device 500).

FIG. 3 is a rear view of the non-nicotine e-vaping device of FIG. 1. Referring to FIG. 3, the second array of air inlets 312 in the rear side of the non-nicotine e-vaping device 500 may be as described in connection with the first array of air inlets 312 in the front side of the non-nicotine e-vaping device 500 shown in FIG. 1. Thus, the relevant disclosures of the air inlets 312 already discussed above will not be repeated in the interest of brevity. However, in some embodiments, the second array of air inlets 312 in the rear side of the non-nicotine e-vaping device 500 shown in FIG. 3 may be different from the first array of air inlets 312 in the front side of the non-nicotine e-vaping device 500 shown in FIG. 1 (or vice versa). For instance, instead of the three staggered rows of seven, eight, and seven air inlets 312 per array, the number of rows and/or the number of air inlets 312 per array may be modified so as to depart from the twenty-two air inlets 312 per array (or the forty-four total air inlets 312 for the non-nicotine e-vaping device 500).

The port 368 is configured to receive an electric current (e.g., via a USB/mini-USB/USB-C cable) from an external power source so as to charge an internal power source within the non-nicotine e-vaping device 500. In addition, the port 368 may also be configured to send data to and/or receive data (e.g., via a USB/mini-USB/USB-C cable) from another non-nicotine e-vaping device or other electronic device (e.g., phone, tablet, computer). Furthermore, the non-nicotine e-vaping device 500 may be configured for wireless communication with another electronic device, such as a phone, via an application software (app) installed on that electronic device. In such an instance, an adult vaper may control or otherwise interface with the non-nicotine e-vaping device 500 (e.g., locate the non-nicotine e-vaping device, check usage information, change operating parameters) through the app.

Although the port 368 is shown as being located on the rear side of the non-nicotine e-vaping device 500 in FIG. 3, it should be understood that other locations are also possible. For instance, in some embodiments, the port 368 may be located instead on the front side of the non-nicotine e-vaping device 500 in FIG. 1. Additionally, in other embodiments, the port 368 may be located on the distal end of the non-nicotine e-vaping device 500 so as to be accessible through the end cap 370.

Figure 4:
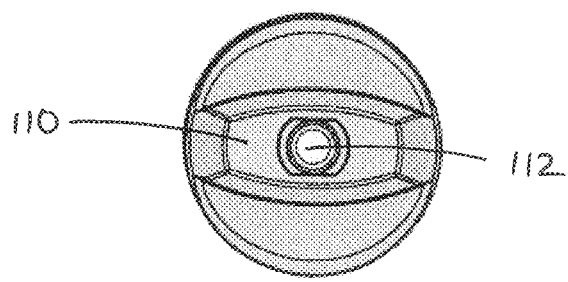
FIG. 4 is a proximal end view of the non-nicotine e-vaping device of FIG. 1.

FIG. 4 is a proximal end view of the non-nicotine e-vaping device of FIG. 1. Referring to FIG. 4, the mouthpiece 110 defines a vapor outlet 112. During vaping, the non-nicotine vapor generated is drawn from the non-nicotine e-vaping device 500 through the vapor outlet 112. Although the vapor outlet 112 is shown as being centered so as to coincide with a central longitudinal axis of the non-nicotine e-vaping device 500, it should be understood that the vapor outlet 112 may be off-centered (e.g., offset from the central longitudinal axis) in some instances. Additionally, although only one vapor outlet 112 is shown in FIG. 4, it should be understood that example embodiments are not limited thereto. In particular, in some embodiments, the mouthpiece 110 may define a plurality of vapor outlets 112. For instance, the mouthpiece 110 may define two vapor outlets 112, which may extend in parallel (e.g., longitudinally) or in a diverging manner. In another instance, the mouthpiece 110 may define three vapor outlets 112. In such an embodiment, the three vapor outlets 112 may be aligned in a linear arrangement such that a vapor outlet 112 in the middle extends longitudinally while the other two vapor outlets 112 extend in a diverging manner. Alternatively, all three vapor outlets 112 may extend in parallel.

It should also be understood that the positioning, arrangement, and quantity of the vapor outlet(s) 112 may be further varied depending on the configuration of the mouthpiece 110. In particular, in example embodiments where the mouthpiece 110 has a cylindrical form or a frustoconical form (instead of a flattened form), additional options may exist for the positioning, arrangement, and quantity of the vapor outlet(s) 112. For instance, when space permits, an embodiment with three vapor outlets 112 may have a triangular arrangement for the vapor outlets 112. Similarly, an embodiment with four vapor outlets 112 may have a triangular arrangement with a central vapor outlet 112 or, alternatively, a quadrilateral (e.g., square, diamond) arrangement. Likewise, an embodiment with more vapor outlets 112 may have a quadrilateral arrangement, a pentagonal arrangement, a hexagonal arrangement, a heptagonal arrangement, or an octagonal arrangement, which may or may not include a central vapor outlet 112.

As shown in the drawings, the non-nicotine e-vaping device 500 may have a generally cylindrical form and a circular cross-section. Alternatively, the non-nicotine e-vaping device 500 may have a generally polyhedron form with a polygonal cross-section. The selection of the general overall form of the non-nicotine e-vaping device 500 make take into account various factors, including (but not limited to) aesthetics, functionality, and manufacturing considerations. For instance, instead of a cylindrical form, the non-nicotine e-vaping device 500 may have a polyhedron form to provide a more contemporary look and/or to prevent or reduce the likelihood of unwanted rolling (e.g., anti-roll design).

A polyhedron form for the non-nicotine e-vaping device 500 may include a triangular prism, a cuboid, a pentagonal prism, a hexagonal prism, a heptagonal prism, or an octagonal prism. With a form resembling a triangular prism, the non-nicotine e-vaping device 500 may have a triangular cross-section (e.g., shape of an equilateral triangle). With a form resembling a cuboid, the non-nicotine e-vaping device 500 may have a square cross-section or a rectangular cross-section. With a form resembling a pentagonal prism, the non-nicotine e-vaping device 500 may have a pentagonal cross-section. With a form resembling a hexagonal prism, the non-nicotine e-vaping device 500 may have a hexagonal cross-section. With a form resembling a heptagonal prism, the non-nicotine e-vaping device 500 may have a heptagonal cross-section. With a form resembling an octagonal prism, the non-nicotine e-vaping device 500 may have an octagonal cross-section.

Figure 5:
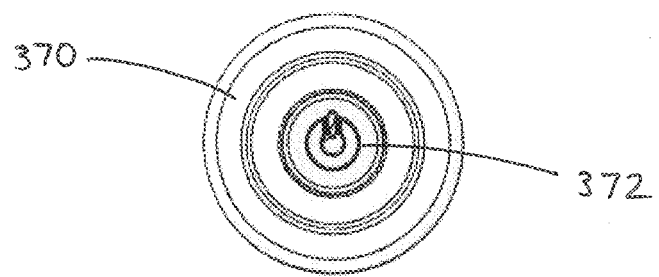
FIG. 5 is a distal end view of the non-nicotine e-vaping device of FIG. 1.

FIG. 5 is a distal end view of the non-nicotine e-vaping device of FIG. 1. Referring to FIG. 5, an end cap 370 and a button 372 are disposed at the distal end of the non-nicotine e-vaping device 500. The end cap 370 may be engaged with the battery section housing 360 via an interference fit (which may also be referred to as a press fit or friction fit). For instance, the outer sidewall of the end cap 370 may be engaged with the corresponding inner sidewall of the battery section housing 360. Additionally, the outer sidewall of the end cap 370 may be knurled to enhance the engagement. In an example embodiment, the end cap 370 also defines an opening configured to accommodate the button 372. In such an instance, the end cap 370 is a stationary structure, while the button 372 is a mobile structure which is movable (e.g., depressible) relative to the end cap 370.

The button 372 may be a power button for the non-nicotine e-vaping device 500. In particular, when pressed, the button 372 may activate a power supply within the non-nicotine e-vaping device 500. Although the button 372 is shown as being located at the distal end of the non-nicotine e-vaping device 500, it should be understood that example embodiments are not limited thereto. For instance, in some embodiments, the button 372 may be located instead on the front of the non-nicotine e-vaping device 500 (e.g., so as to be on the same side as the light pipe 358).

Figure 6:
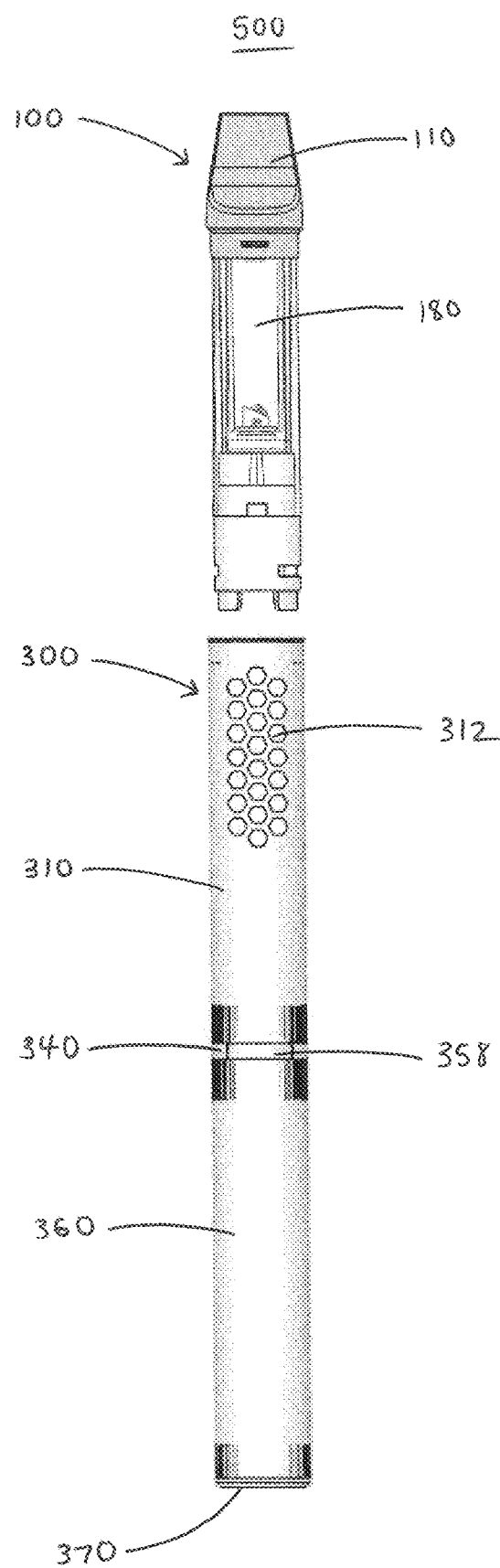
FIG. 6 is a front view of the non-nicotine e-vaping device of FIG. 1 when the non-nicotine cartridge and the device body are not engaged.

FIG. 6 is a front view of the non-nicotine e-vaping device of FIG. 1 when the non-nicotine cartridge and the device body are not engaged. Referring to FIG. 6, the non-nicotine e-vaping device 500 includes a non-nicotine cartridge 100 and a device body 300, wherein the device body 300 is configured to receive the non-nicotine cartridge 100. The non-nicotine cartridge 100 includes a housing configured to hold a non-nicotine pre-vapor formulation 180. When the non-nicotine cartridge 100 is engaged with the device body 300, a majority of the non-nicotine cartridge 100 may be hidden from view by the sleeve section 310 while the mouthpiece 110 remains visible (e.g., as shown in FIG. 1). The non-nicotine pre-vapor formulation 180 within the non-nicotine cartridge 100 may also be visible through the device body 300 via the air inlets 312 in the sleeve section 310. During vaping, the non-nicotine pre-vapor formulation 180 is heated to generate a non-nicotine vapor which is drawn from the non-nicotine e-vaping device 500 via the mouthpiece 110.

The non-nicotine cartridge 100 may be regarded as a consumable which is replaced once the non-nicotine pre-vapor formulation 180 therein is depleted. The level of the non-nicotine pre-vapor formulation 180 within the non-nicotine cartridge 100 may be visually ascertained through the air inlets 312 in the sleeve section 310. In some instances, the non-nicotine e-vaping device 500 may additionally provide a notification (e.g., via the light pipe 358) when the non-nicotine pre-vapor formulation 180 within the non-nicotine cartridge 100 is deemed depleted. In other instances, the non-nicotine e-vaping device 500 may also provide an indication (e.g., via the light pipe 358) that another unacceptable condition exists. Examples of other unacceptable conditions include (but are not limited to) a poor electrical connection and/or an unauthorized non-nicotine cartridge or an authorized non-nicotine cartridge that is no longer deemed appropriate for vaping (e.g., an overly long period of time, such as a year, has passed since vaping first occurred with the non-nicotine cartridge).

The form of the device body 300 may correspond to the form of the non-nicotine cartridge 100 (e.g., generally cylindrical form for both the device body 300 and the non-nicotine cartridge 100). However, in other instances, the form of the device body 300 may be different from the form of the non-nicotine cartridge 100. For instance, the non-nicotine cartridge 100 may have a cylindrical form, while the device body 300 may have one of the different forms disclosed herein (e.g., cuboid form) or vice versa. Thus, the non-nicotine e-vaping device 500 may have an overall form (which is influenced primarily by the device body 300) that is different from the form of the non-nicotine cartridge 100.

Figure 7:
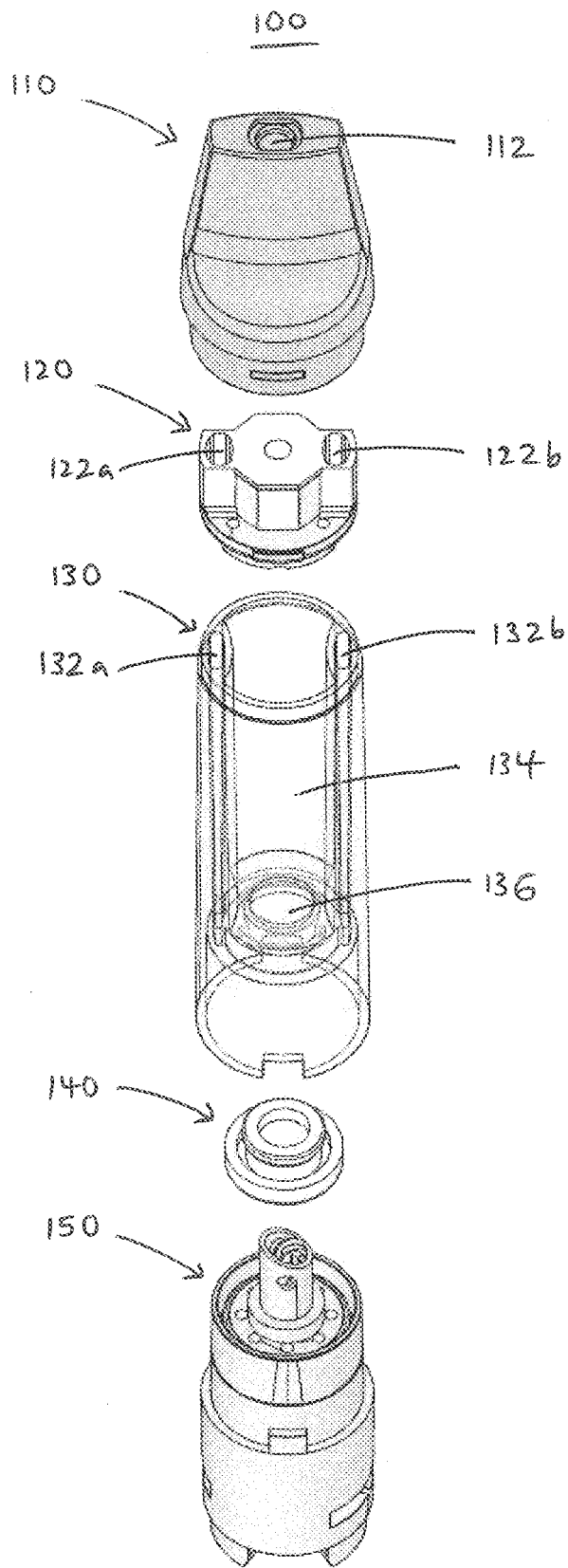
FIG. 7 is an exploded view of the non-nicotine cartridge in FIG. 6.

FIG. 7 is an exploded view of the non-nicotine cartridge in FIG. 6. Referring to FIG. 7, the non-nicotine cartridge 100 includes a mouthpiece 110, a first seal 120, a tank 130, a second seal 140, and a vaporizer 150. The tank 130 defines a reservoir 134 configured to hold a non-nicotine pre-vapor formulation 180 when the non-nicotine cartridge 100 is assembled. In addition, the sidewall of the tank 130 may define at least one vapor channel extending therethrough. As illustrated, the sidewall of the tank 130 defines vapor channels 132a and 132b (which may also be referred to as first vapor channel 132a and second vapor channel 132b). In an example embodiment, the vapor channels 132a and 132b may be defined within opposite sides of the sidewall of the tank 130 (e.g., diametrically opposed) such that the reservoir 134 is between the vapor channels 132a and 132b. The vapor channels 132a and 132b may also be parallel to each other and to a longitudinal axis of the tank 130. The tank 130 may be formed of a transparent material to permit a viewing of the contents therein (e.g., non-nicotine pre-vapor formulation 180).

The first seal 120 and the second seal 140 are configured to seal or close off the reservoir 134. The first seal 120 defines apertures 122a and 122b (which may also be referred to as first aperture 122a and second aperture 122b). As a result, when the first seal 120 is engaged with the tank 130 to seal the proximal side of the reservoir 134, the apertures 122a and 122b will be aligned with the vapor channels 132a and 132b, respectively. With such an engagement, the non-nicotine vapor generated by the vaporizer 150 during vaping can travel up the vapor channels 132a and 132b and through the apertures 122a and 122b, respectively, to the mouthpiece 110 and out the vapor outlet 112. When the non-nicotine cartridge 100 is assembled, the first seal 120 may be obscured from view by the mouthpiece 110 (which also engages with the tank 130). Additionally, the first seal 120 may be formed of or include a resilient material of construction (e.g., silicone).

The second seal 140 is configured to engage with the tank 130 to seal the distal side of the reservoir 134. In particular, the second seal 140 is configured to seal the distal side of the reservoir 134 by closing off the opening 136 the tank 130. In an example embodiment, the second seal 140 is formed of a resilient material (e.g., silicone) and includes a head portion, a body portion, and a neck portion between the head portion and the body portion. The diameter of the head portion of the second seal 140 is larger than the diameter of the opening 136 and smaller than the diameter of the body portion of the second seal 140, while the diameter of the neck portion of the second seal 140 may correspond to the diameter of the opening 136. As a result, when the head portion of the second seal 140 is urged through the opening 136 in the tank 130, the neck portion of the second seal 140 can be resiliently seated in the opening 136 in a liquid-tight manner, while the head portion of the second seal 140 is within the reservoir 134 and the body portion of the second seal 140 is outside the reservoir 134. In such an instance, by gripping the opposing surfaces of the tank 130 defining the opening 136, the head portion and the body portion of the second seal 140 can help to ensure that the second seal 140 provides the desired sealing while maintaining its proper positioning.

Thus, the first seal 120 and the second seal 140 are configured to engage the tank 130 such that the reservoir 134 is sealed and isolated from the vapor channels 132a and 132b. The combination of the first seal 120, the tank 130, and the second seal 140 may also be collectively referred to as a housing of the non-nicotine cartridge 100. In an example embodiment, the second seal 140 may be configured as a puncturable structure that completely covers the opening 136 in the tank 130 (when in an unpunctured/ unpierced state). In such an embodiment, the reservoir 134 may remain sealed until the vaporizer 150 is received by and engaged with the tank 130 (e.g., during assembly, before vaping) such that the tip of the vaporizer 150 pierces the second seal 140 and extends through the opening 136 and into the reservoir 134 to access the non-nicotine pre-vapor formulation 180 therein (e.g., as shown in FIG. 6).

Figure 8:
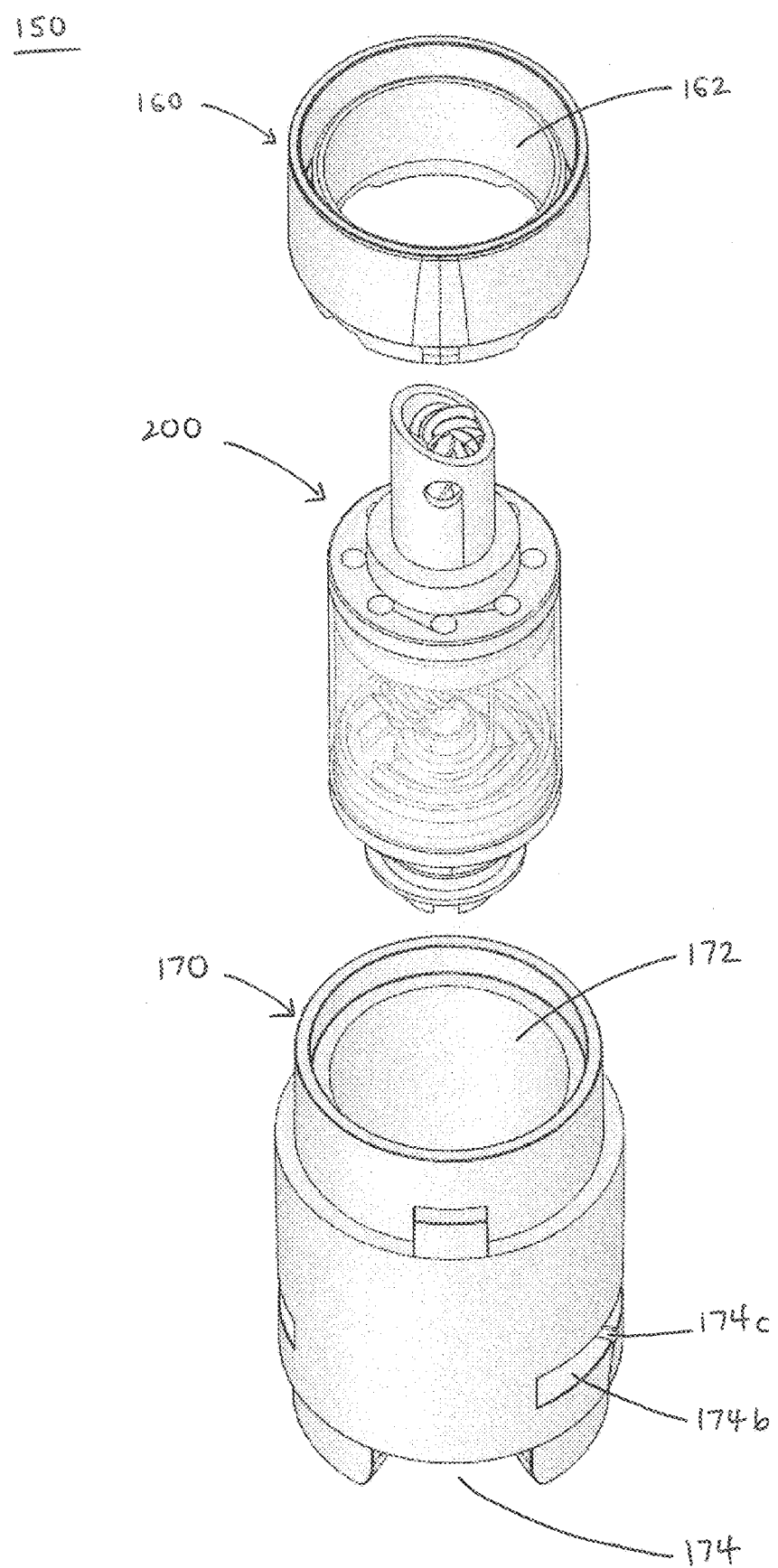
FIG. 8 is a first exploded view of the vaporizer in FIG. 7.
Figure 9:
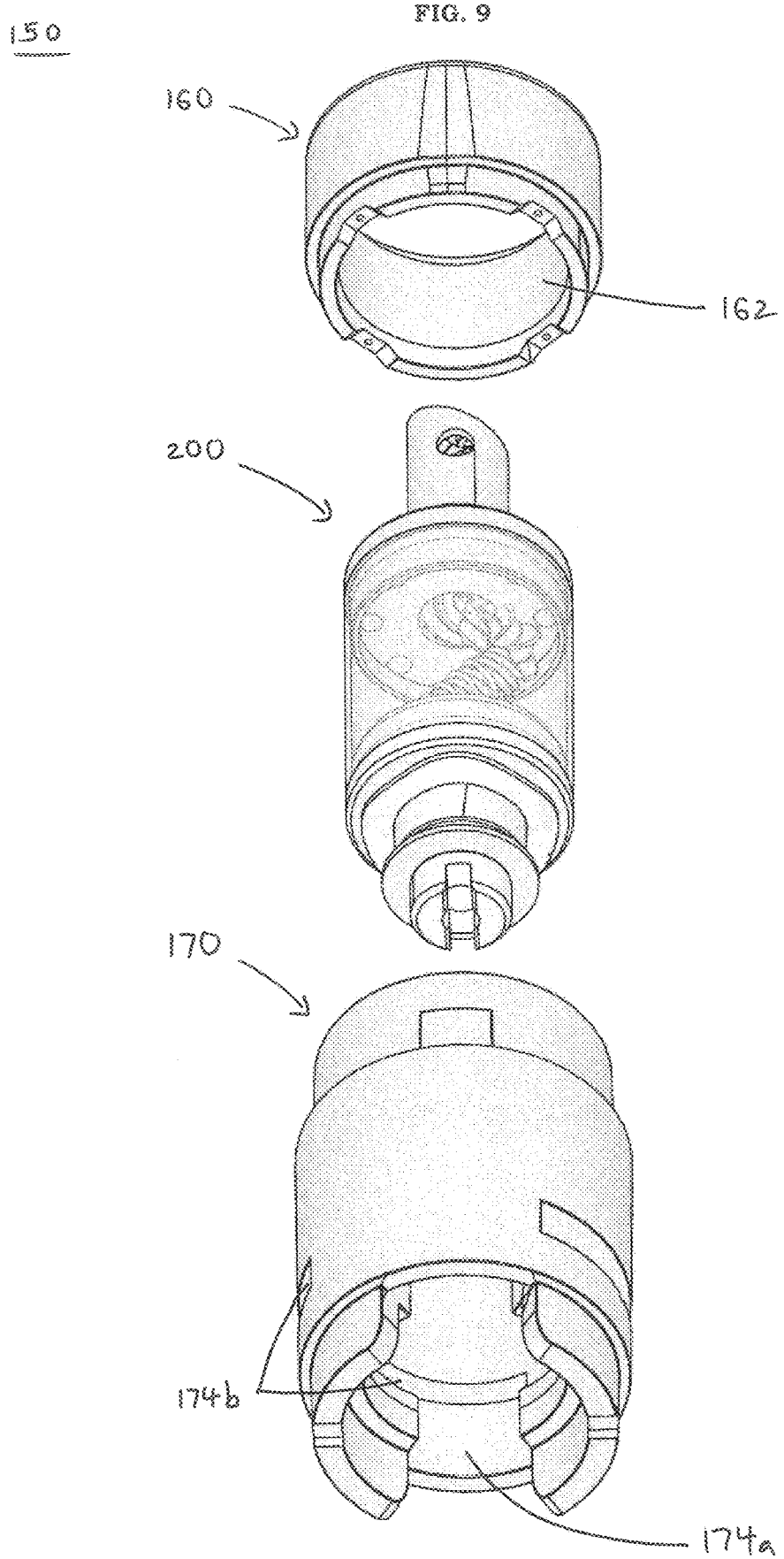
FIG. 9 is a second exploded view of the vaporizer in FIG. 7.

FIG. 8 is a first exploded view of the vaporizer in FIG. 7. FIG. 9 is a second exploded view of the vaporizer in FIG. 7. Referring to FIGS. 8-9, the vaporizer 150 includes a vaporizing module 200, which may be held at least partly within a catch ring 160 and a bayonet connector 170. The catch ring 160 defines an opening 162 configured to accommodate the vaporizing module 200. Similarly, the bayonet connector 170 defines an opening 172 configured to receive the vaporizing module 200. When the vaporizer 150 is assembled, the catch ring 160 will engage with the bayonet connector 170 so as to surround and hold the vaporizing module 200. Additionally, the tip or piercing portion of the vaporizing module 200 will protrude beyond the rim of the catch ring 160, while the remaining portion of the vaporizing module 200 will be substantially or completely hidden from view within the bayonet connector 170 depending on the angle. In an example embodiment, the vaporizing module 200 may be retained by/within the catch ring 160 and the bayonet connector 170 via an interference fit.

The bayonet connector 170 (which is part of the vaporizer 150 and, thus, part of the non-nicotine cartridge 100) facilitates a connection between the non-nicotine cartridge 100 and the device body 300. As illustrated in FIGS. 8-9, the bayonet connector 170 defines a pair of slots 174 each configured to receive a corresponding engagement member. Each of the slots 174 includes a longitudinal portion 174*a* and a circumferential portion 174*b*. Additionally, the circumferential portion 174*b* may include a furrow 174*c* to help retain a corresponding engagement member. The establishment of a bayonet connection between the non-nicotine cartridge 100 and the device body 300 will be discussed in more detail herein.

Figure 10:
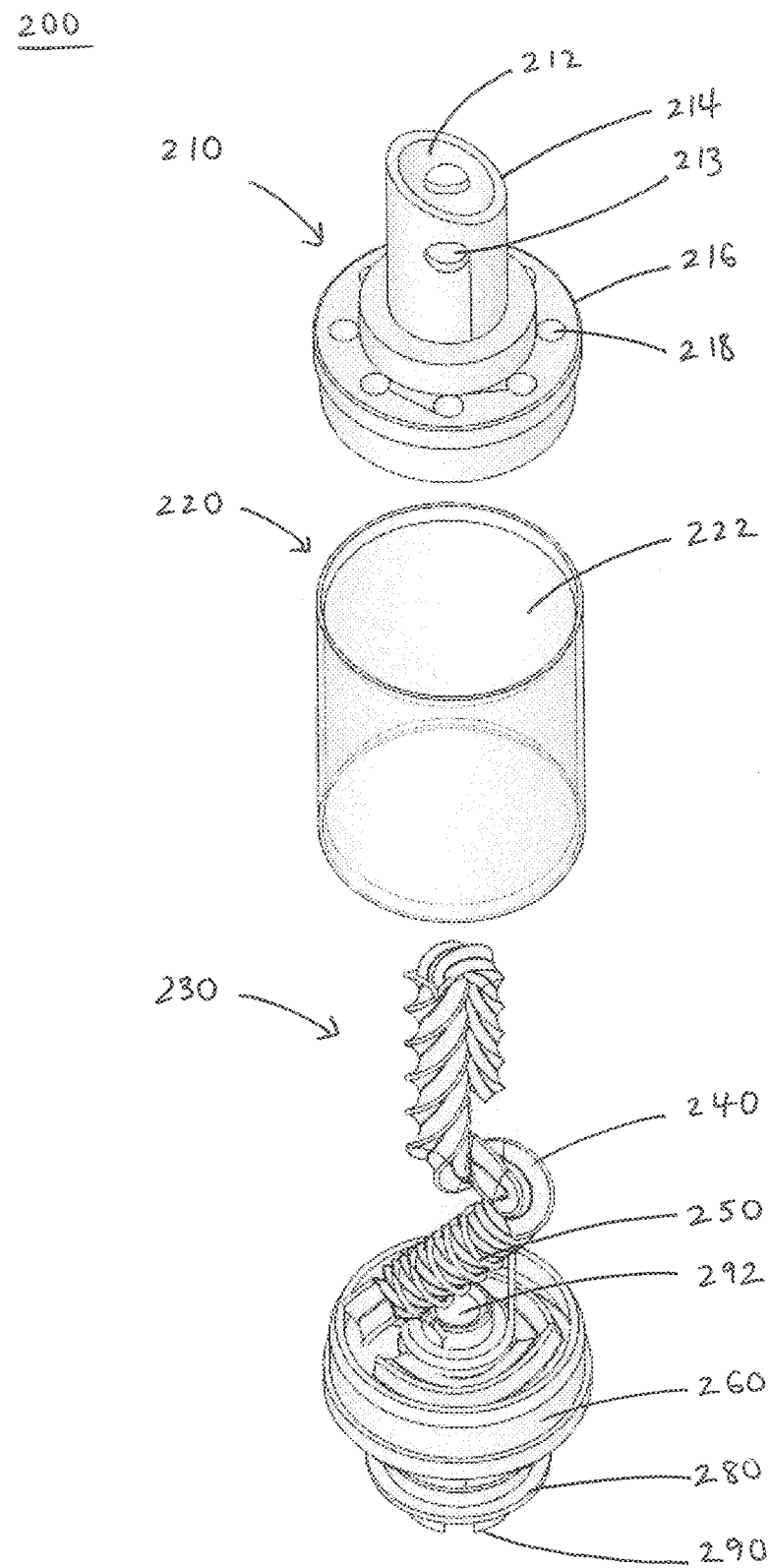
FIG. 10 is an exploded view of the vaporizing module in FIG. 8.
Figure 11:
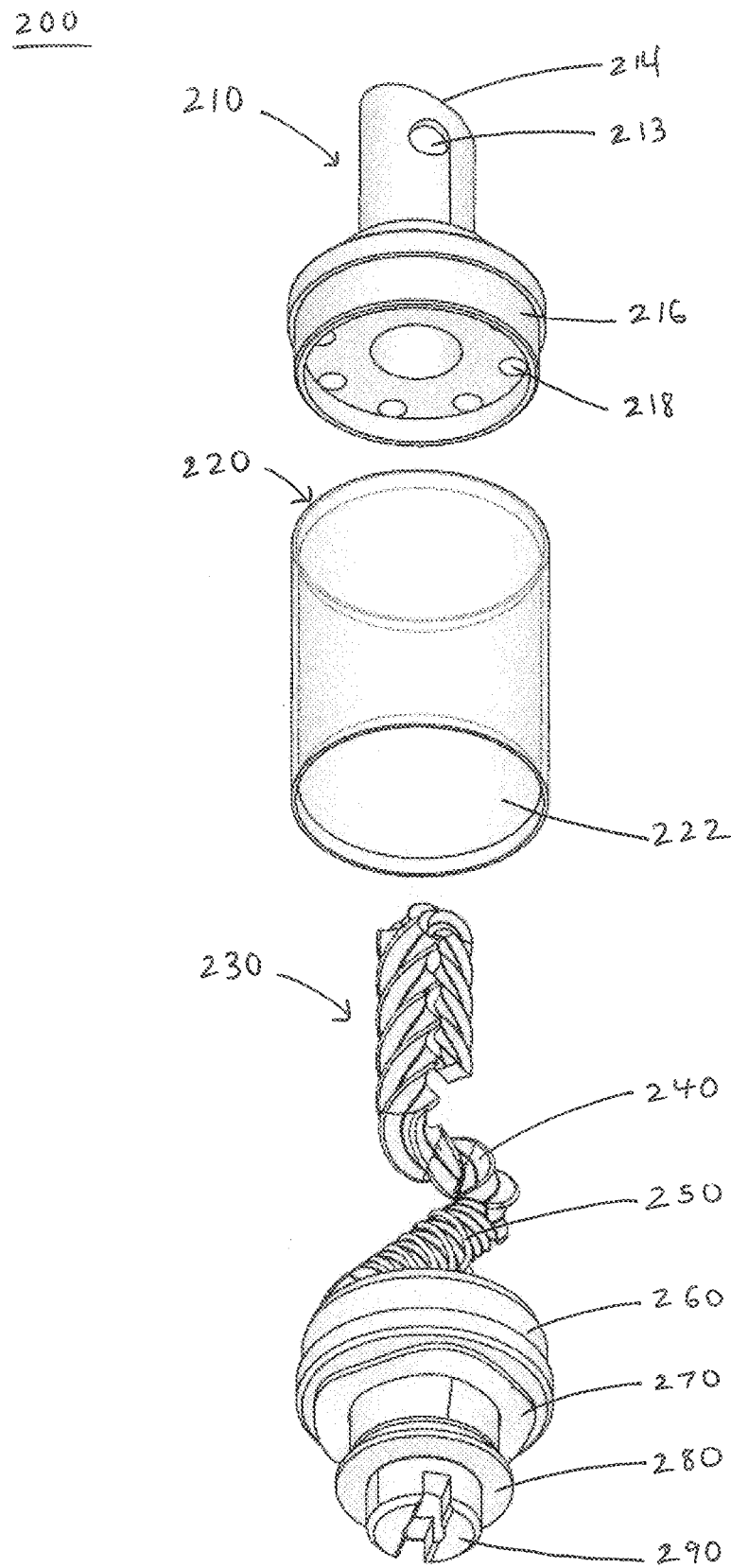
FIG. 11 is an exploded view of the vaporizing module in FIG. 9.

FIG. 10 is an exploded view of the vaporizing module in FIG. 8. FIG. 11 is an exploded view of the vaporizing module in FIG. 9. Referring to FIGS. 10-11, the vaporizing module 200 includes a first module cover 210, a module housing 220, and a heater-wick subassembly 230. The module housing 220 defines a chamber 222, which may also be referred to as a heating chamber or a vaporization chamber. In an example embodiment, the module housing 220 may be formed of a transparent material to permit a viewing of the contents within the chamber 222. The first module cover 210 is configured to engage with a proximal end of the module housing 220. The heater-wick subassembly 230 is configured to engage with the opposing distal end of the module housing 220. In this manner, the open ends of the module housing 220 may be bounded (e.g., capped) by the first module cover 210 and the heater-wick subassembly 230.

The first module cover 210 includes a cap portion 216 and a piercing portion 214 that protrudes from the cap portion 216. The cap portion 216 of the first module cover 210 defines a plurality of apertures 218, which may be evenly spaced from each other and disposed as a circular arrangement around the piercing portion 214. In an example embodiment, the cap portion 216 defines eight apertures 218. However, it should be understood that the quantity, shape, and/or arrangement of the apertures 218 in the cap portion 216 may be varied as appropriate to achieve the desired passage of the aerosol therethrough from the chamber 222. For instance, in the alternative, the cap portion 216 may define only two apertures 218, wherein each has an elongated shape and is arranged in a diametrically opposed manner so as to be aligned with the vapor channels 132*a* and 132*b* in the tank 130 when the vaporizer 150 is engaged with the tank 130. With regards to assembling the vaporizing module 200, the cap portion 216 of the first module cover 210 has an outer side surface configured to engage with a corresponding inner side surface of the module housing 220.

The piercing portion 214 defines an orifice 212 which may extend longitudinally through the first module cover 210. For instance, the orifice 212 in the piercing portion 214 may coincide with a central longitudinal axis of the first module cover 210. In addition, the piercing portion 214 defines holes 213 in its sidewall. The holes 213 may be regarded as extending transversely through the piercing portion 214 so as to be orthogonal to the orifice 212. Although a pair of holes 213 are illustrated in FIG. 10, it should be understood that example embodiments are not limited thereto. For instance, the piercing portion 214 may instead define a different number (e.g., three, four) of holes 213 in its sidewall. Furthermore, the piercing portion 214 may have an angled proximal surface that tapers to a pointed end or tip so as to facilitate an insertion of the piercing portion 214 through the second seal 140, through the opening 136 in the tank 130, and into the reservoir 134. When the vaporizer 150 is in fluidic communication with the reservoir 134, the non-nicotine pre-vapor formulation 180 enters the vaporizing module 200 via the orifice 212 and/or the holes 213 in the piercing portion 214.

The heater-wick subassembly 230 includes a second module cover 260 which may function as a base or support for the other parts of the heater-wick subassembly 230. As a result, the other parts of the heater-wick subassembly 230 may be mounted or secured to the second module cover 260 in an integrated manner. In an example embodiment, the second module cover 260 may be formed of a conductive material. For instance, the conductive material may include steel (e.g., 304 stainless steel). With regards to assembling the vaporizing module 200, the second module cover 260 has an outer side surface configured to engage with a corresponding inner side surface of the module housing 220.

The heater-wick subassembly 230 additionally includes a wick 240 configured to draw or transport the non-nicotine pre-vapor formulation 180 from the reservoir 134 into the vaporizing module 200. The wick 240 may be a fibrous structure with pores/interstices designed for capillary action. In an example embodiment, the wick 240 may have a cord-like form wherein strands of fiber are braided, twisted, and/or woven together. When the vaporizing module 200 is assembled, a proximal portion of the wick 240 may extend into the first module cover 210, while a distal portion of the wick 240 may be supported/held by the second module cover 260.

For instance, the proximal portion of the wick 240 may be disposed within the piercing portion 214 of the first module cover 210 so as to substantially occupy the orifice 212 (e.g., FIG. 8), thus helping to modulate a supply of the non-nicotine pre-vapor formulation 180 from the reservoir 134. As a result, the possibility of the non-nicotine pre-vapor formulation 180 flowing in excess into the chamber 222 (via the orifice 212 and/or the holes 213) may be reduced or prevented. Instead, the non-nicotine pre-vapor formulation 180 may be drawn into the chamber 222 substantially on an as needed basis. In particular, when the non-nicotine pre-vapor formulation 180 within the wick 240 is heated to generate a non-nicotine vapor (and, thus, depleted) during vaping, the wick 240 will draw additional non-nicotine pre-vapor formulation 180 from the reservoir 134 to replenish the non-nicotine pre-vapor formulation 180 depleted within the wick 240. The non-nicotine pre-vapor formulation 180 from the reservoir 134 may enter the first module cover 210 through the orifice 212 and/or the holes 213 before being drawn into the wick 240 via capillary action. On the other hand, when vaping is not occurring, the drawing of the non-nicotine pre-vapor formulation 180 from the reservoir 134 by the wick 240 may slow or stop once the wick 240 is saturated. In addition, a seepage of the non-nicotine pre-vapor formulation 180 into the apertures 218 may be reduced or prevented by the engagement of the first module cover 210 and the second seal 140.

An integral heater-thermocouple 250 is arranged so as to be in thermal contact with the wick 240. The non-nicotine e-vaping device 500 is configured such that the integral heater-thermocouple 250 will be activated during vaping to heat the non-nicotine pre-vapor formulation 180 in the wick 240 to generate a non-nicotine vapor. The integral heater-thermocouple 250 may be designed to undergo Joule heating (which is also known as ohmic/resistive heating) upon the application of an electric current thereto. Stated in more detail, the integral heater-thermocouple 250 may be formed of conductors (resistive materials) and configured to produce heat when an electric current passes therethrough. The electric current may be supplied from a power source (e.g., battery) within the device body 300.

In an example embodiment, the integral heater-thermocouple 250 is in a form of a helical coil that wraps (e.g., spirals) around the wick 240. For example, the integral heater-thermocouple 250 may wrap around a lower portion of the wick 240 (e.g., around a portion of the wick 240 not protruding into the piercing portion 214). Additionally, in such an instance, the integral heater-thermocouple 250 may be oriented such that the axis of its helix is at an angle (e.g., neither parallel nor orthogonal) relative to the longitudinal axis of the vaporizing module 200. The integral heater-thermocouple 250 will be discussed in more detail herein.

As shown in FIG. 11, a first electrical contact 270 may be disposed on an upstream side of the second module cover 260. When assembled, the distal end of the second module cover 260 extends through an opening defined by the first electrical contact 270. In an example embodiment, the first electrical contact 270 is structured as a washer with an undulated or wavelike form. The first electrical contact 270 may be covered with gold plating. For instance, the first electrical contact 270 may have an interior (underlying structure) formed of steel (e.g., spring steel) and an exterior formed of gold (e.g., as a deposited layer).

A second electrical contact 290 may be disposed at the distal end of the heater-wick subassembly 230 while extending through the first electrical contact 270 and the second module cover 260. In an example embodiment, the second electrical contact 290 may be covered with gold plating. For instance, the second electrical contact 290 may have an interior (underlying structure) formed of brass and an exterior formed of gold (e.g., as a deposited layer). The second electrical contact 290 also defines a passage 292 which allows an airflow into the chamber 222.

When the heater-wick subassembly 230 is assembled, a first end of the integral heater-thermocouple 250 may be electrically connected to the second module cover 260/first electrical contact 270, while the second end of the integral heater-thermocouple 250 may be electrically connected to the second electrical contact 290. An insulator 280 electrically isolates the second electrical contact 290 from the second module cover 260/first electrical contact 270. In an example embodiment, the insulator 280 is structured as a grommet with a sheath-like form that receives the second electrical contact 290 and extends through the second module cover 260/first electrical contact 270. Additionally, in such an instance, the first end of the integral heater-thermocouple 250 may be secured between the second module cover 260 and the insulator 280, while the second end of the integral heater-thermocouple 250 may be secured between the insulator 280 and the second electrical contact 290.

Figure 12:
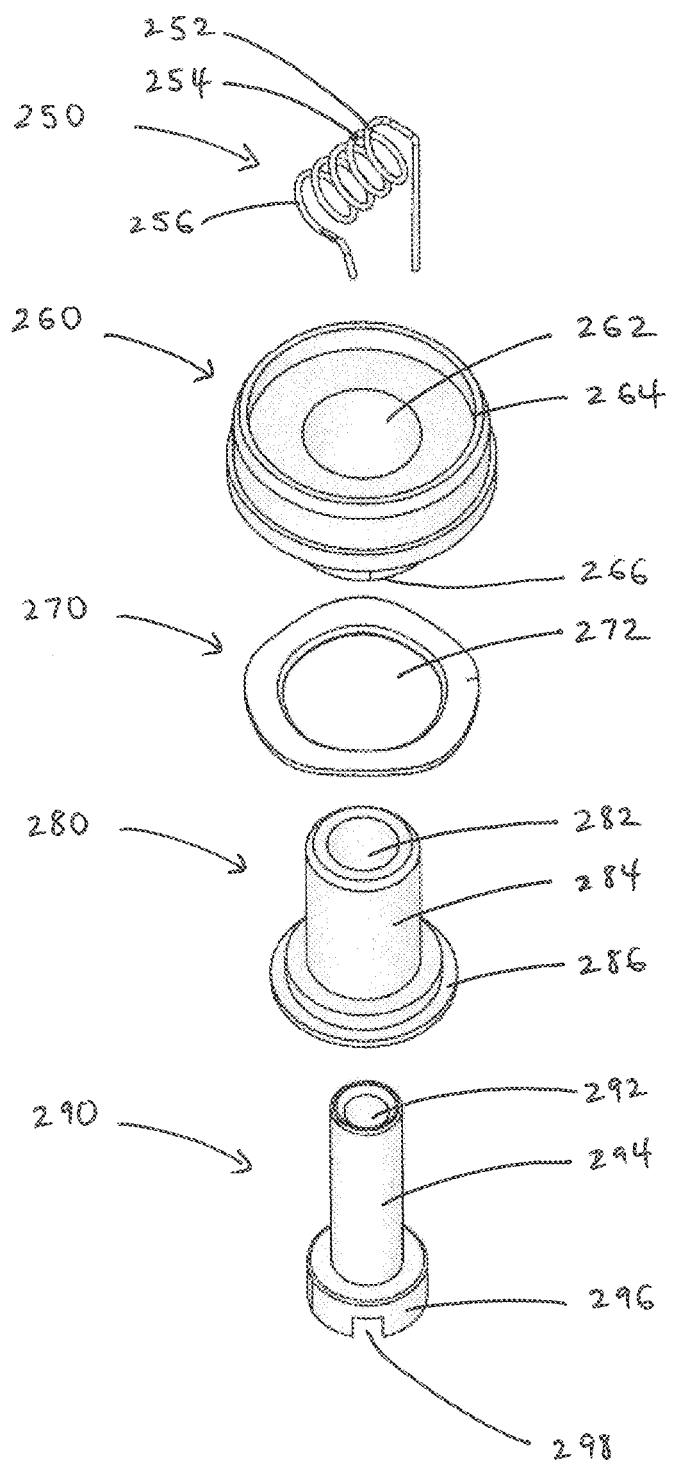
FIG. 12 is an exploded view of the heater subassembly in FIG. 10.
Figure 13:
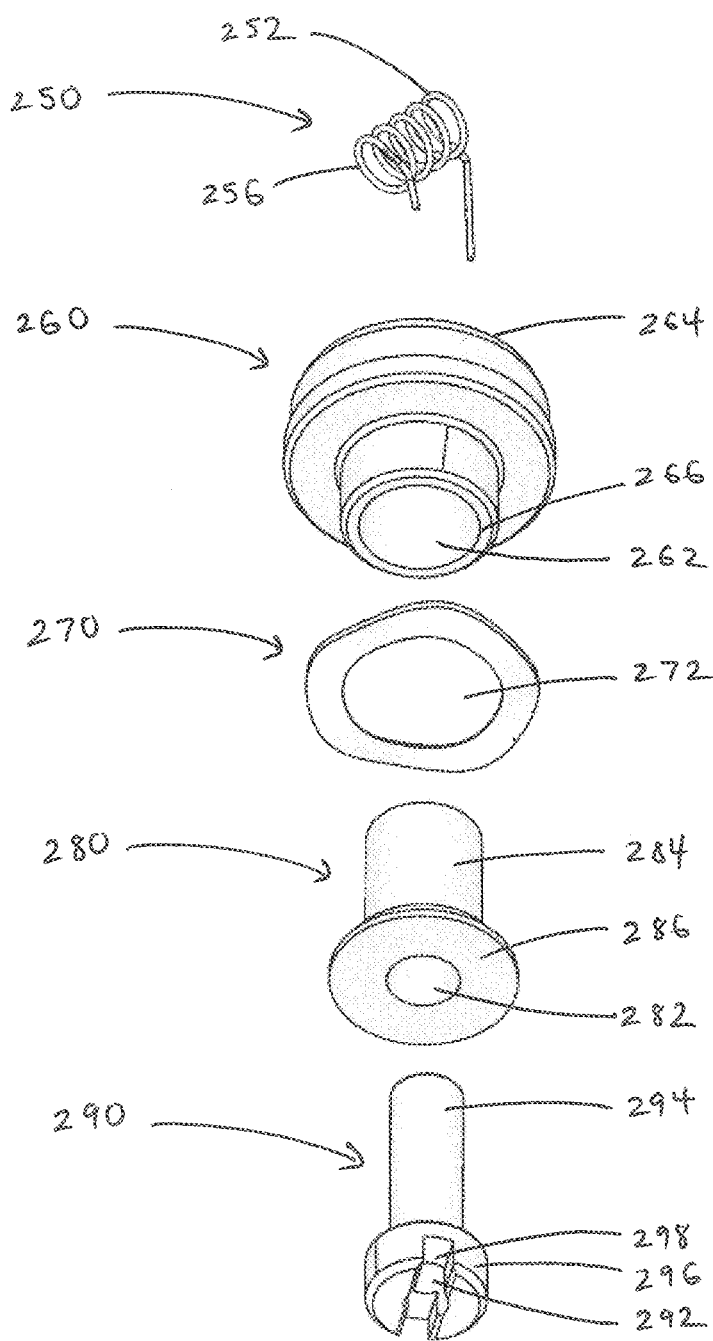
FIG. 13 is an exploded view of the heater subassembly in FIG. 11.

FIG. 12 is an exploded view of the heater subassembly in FIG. 10. FIG. 13 is an exploded view of the heater subassembly in FIG. 11. In particular, the heater subassembly is the heater-wick subassembly 230 without the wick 240. Referring to FIGS. 12-13, the integral heater-thermocouple 250 includes a first segment 252 and a second segment 256. The first segment 252 and the second segment 256 are connected at a junction 254 (which may also be referred to as a "hot" junction). Additionally, the first segment 252 is made of a first alloy, and the second segment 256 is made of a second alloy (that is different from the first alloy).

In an example embodiment where the integral heater-thermocouple 250 is in a form of a helical structure (that is wrapped around the wick 240), the helical structure includes a plurality of coils. In such an instance, the plurality of coils includes at least one coil corresponding to the first segment 252 and at least one coil corresponding to the second segment 256. As a result, the at least one coil of the first segment 252 is made of the first alloy, and the at least one coil of the second segment 256 is made of the second alloy. Additionally, the at least one coil of the first alloy may be welded to the at least one coil of the second alloy at a junction 254.

The plurality of coils of the integral heater-thermocouple 250 may be in a form of five to ten total coils (e.g., six to nine total coils). For instance, the first segment 252 of the integral heater-thermocouple 250 may include one coil of the first alloy, and the second segment 256 may include five coils of the second alloy. Alternatively, the first segment 252 of the integral heater-thermocouple 250 may include two coils of the first alloy, and the second segment 256 may include four coils of the second alloy.

With regard to orientation, the vaporizing module 200 may be regarded as including a housing having a first longitudinal axis, and the helical structure of the integral heater-thermocouple 250 may be regarded as having a second longitudinal axis that intersects the first longitudinal axis to form an oblique angle. In such an instance, the at least one coil of the first segment 252 (which is made of the first alloy) is downstream from the at least one coil of the second segment 256 (which is made of the second alloy).

According to an example embodiment, the first alloy is a nickel-aluminum alloy, and the second alloy is a nickel-chromium alloy. For instance, the nickel-aluminum alloy may include 95% nickel and 2% aluminum (e.g., Alumel), and the nickel-chromium alloy may include 90% nickel and 10% chromium (e.g., Chromel). With regard to physical properties, the first alloy has a first electrical resistivity and a first thermal conductivity, and the second alloy has a second electrical resistivity and a second thermal conductivity. In an example embodiment, the first electrical resistivity is less than the second electrical resistivity, and the first thermal conductivity is greater than the second thermal conductivity. Additionally, the integral heater-thermocouple 250 may have a Seebeck coefficient of about 35 to 75 µV/° C. (e.g., 41 µV/° C., 50 µV/° C., 68 µV/° C.). Furthermore, the integral heater-thermocouple 250 may have an overall resistance of about 0.5 to 3.5Ω (e.g., 1Ω).

As noted supra, the integral heater-thermocouple 250 is configured to undergo Joule heating (which is also known as ohmic/resistive heating) upon the application of an electric current thereto. In addition, the integral heater-thermocouple 250 has a first segment 252 of a first alloy that is connected to a second segment 256 of a second alloy (which is different from the first alloy) at a junction 254. As a result of the dissimilar alloys and the associated thermoelectric effect, a voltage is created when the junction 254 experiences a change in temperature (e.g., such as when Joule heating is occurring to generate a non-nicotine vapor). This voltage is temperature-dependent and thus can be used to determine the temperature at the junction 254. For instance, the relationship between voltage and temperature may be determined from empirical studies and stored in a lookup table (LUT). In this manner, the integral heater-thermocouple 250 can function as both a heater and a thermocouple.

The second module cover 260 defines an opening 262 and has a proximal rim 264 and a distal rim 266 around the opening 262. As shown in the drawings, the circumference of the proximal rim 264 may be larger than the circumference of the distal rim 266. The proximal rim 264 of the second module cover 260 may help to hold a distal portion of the wick 240 and/or to contain a small quantity of the non-nicotine pre-vapor formulation 180 that may seep therefrom. In addition, the outer edge of the proximal rim 264 may be beveled to facilitate an engagement with the module housing 220.

The first electrical contact 270 defines an opening 272 and has an annular form which may also be wavelike. During assembly, the first electrical contact 270 is engaged with the second module cover 260 such that the distal rim 266 of the second module cover 260 extends through the opening 272 in the first electrical contact 270. As a result, when assembled, the first electrical contact 270 may be positioned against an underside of the second module cover 260 (e.g., via an interference fit with distal rim 266).

The insulator 280 includes a sheath portion 284 and a flange portion 286 and also defines an opening 282 extending therethrough. During assembly, the insulator 280 is inserted through the second module cover 260 (as well as through the first electrical contact 270) such that the outer sidewall of the sheath portion 284 engages with the sidewall of the opening 262 in the second module cover 260. In addition, when assembled, the flange portion 286 of the insulator 280 may abut the distal rim 266 of the second module cover 260.

The second electrical contact 290 includes a shaft portion 294 and a base portion 296 and also defines a passage 292 extending therethrough. When assembled, the second electrical contact 290 extends through the opening 282 in the insulator 280 (as well as through the first electrical contact 270 and the second module cover 260) such that the passage 292 in the second electrical contact 290 leads to the chamber 222 in the vaporizing module 200. Additionally, the base portion 296 of the second electrical contact 290 may abut the flange portion 286 of the insulator 280. As noted supra, the insulator 280 electrically isolates the second electrical contact 290 from the second module cover 260/first electrical contact 270. Furthermore, the base portion 296 also defines a groove 298 which extends orthogonally to the longitudinal axis of the second electrical contact 290. In an example embodiment and as will be discussed in more detail herein, the groove 298 in the base portion 296 is configured to provide access for inflowing air to enter the passage 292 in the second electrical contact 290 when the non-nicotine cartridge 100 is engaged with the device body 300.

In the heater subassembly, a first end corresponding to the first segment 252 of the integral heater-thermocouple 250 may be electrically connected to the second module cover 260/first electrical contact 270, while the second end corresponding to the second segment 256 of the integral heater-thermocouple 250 may be electrically connected to the second electrical contact 290. In particular, the first end corresponding to the first segment 252 of the integral heater-thermocouple 250 may be secured between the second module cover 260 and the insulator 280, while the second end corresponding to the second segment 256 of the integral heater-thermocouple 250 may be secured between the insulator 280 and the second electrical contact 290.

Figure 14:
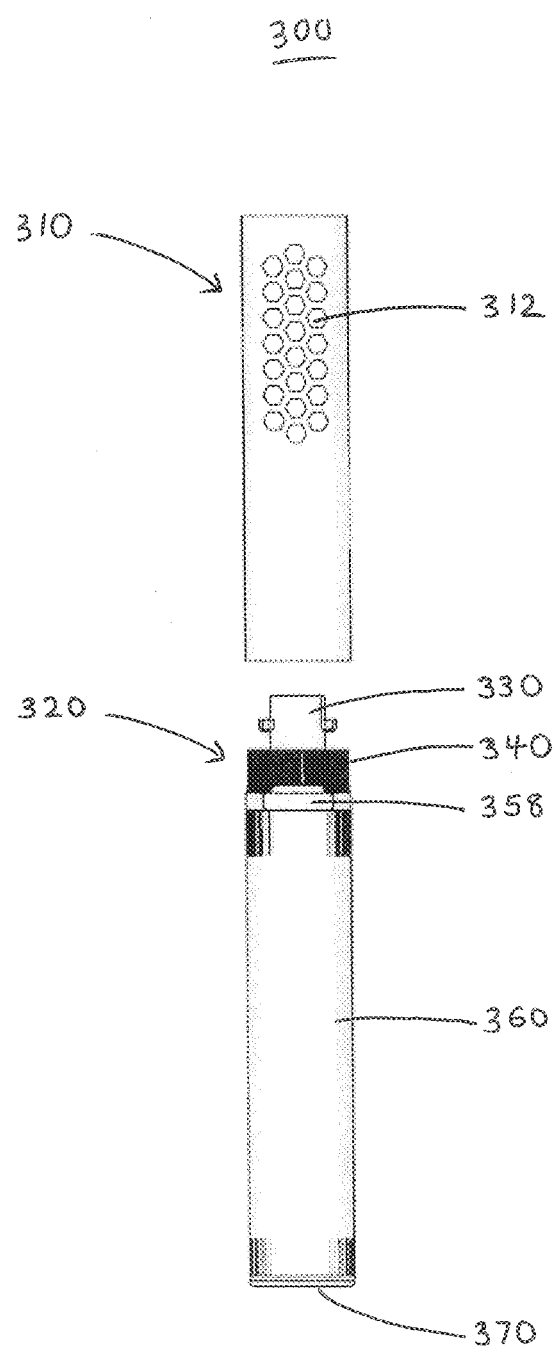
FIG. 14 is a partially-exploded view of the device body in FIG. 6.

FIG. 14 is a partially-exploded view of the device body in FIG. 6. Referring to FIG. 14, the device body 300 includes a sleeve section 310 and a battery section 320. The sleeve section 310 is configured to receive the non-nicotine cartridge 100 when the non-nicotine cartridge 100 is inserted into the device body 300 to engage with the battery section 320. Additionally, as illustrated, the sleeve section 310 defines an array of inlet openings or air inlets 312. The array of inlet openings or air inlets 312 may be in a form of a honeycomb pattern configured to facilitate an intake of ambient air which enters the device body 300 and travels toward the power supply (within the battery section 320) before moving inward and then toward the integral heater-thermocouple 250 in the non-nicotine cartridge 100.

The battery section 320 includes a bayonet adapter 330 that is configured to engage with the bayonet connector 170 of the non-nicotine cartridge 100. In particular, to engage the non-nicotine cartridge 100 with the device body 300, the distal end of the non-nicotine cartridge 100 (the end of the non-nicotine cartridge 100 with the bayonet connector 170) is inserted into the sleeve section 310 of the device body 300 until the slots 174 of the bayonet connector 170 initially mate with the engagement members of the bayonet adapter 330. Once the initial mating occurs, the non-nicotine cartridge 100 can then be turned/twisted/rotated relative to the device body 300 to interlock with the device body 300. As a result, a non-nicotine e-vaping device 500 may be provided wherein a bayonet connection is established between the non-nicotine cartridge 100 and the device body 300. The battery section 320 of the device body 300 also includes a knurled connector 340, a light pipe 358, a battery section housing 360, and an end cap 370, which have been discussed supra in connection with earlier figures. As a result, such descriptions will not be repeated herein in the interest of brevity, although additional details may be subsequently provided herein.

Figure 15:
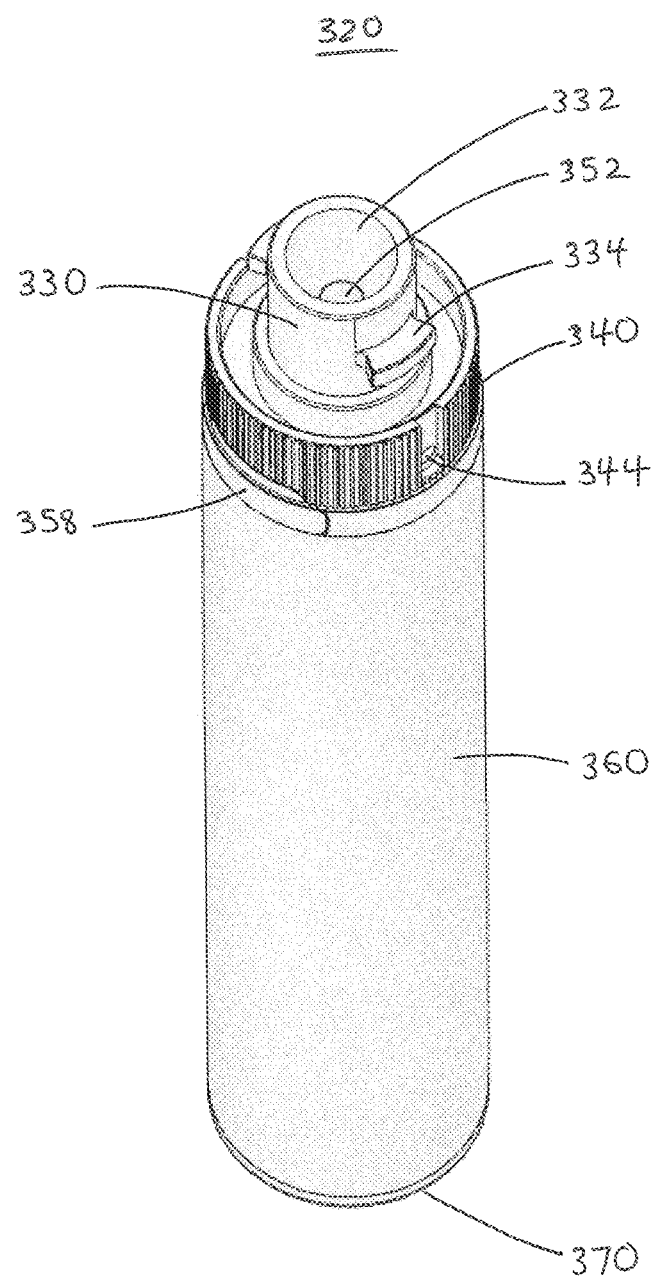
FIG. 15 is a perspective view of the battery section in FIG. 14.

FIG. 15 is a perspective view of the battery section in FIG. 14. Referring to FIG. 15, the bayonet adapter 330 includes at least one engagement member 334 configured to mate/interlock with the bayonet connector 170 of the non-nicotine cartridge 100. In an example embodiment, the bayonet adapter 330 includes a pair of engagement members 334 which protrude from its outer sidewall. Additionally, the engagement members 334 may be diametrically opposed from each other. The bayonet adapter 330 also defines an opening 332 which exposes (e.g., so as to provide access to) a pin 352. The bayonet adapter 330 and the pin 352 of the battery section 320 may be regarded as the electrical contacts of the device body 300. In particular, when the device body 300 is engaged with the non-nicotine cartridge 100, the bayonet adapter 330 is configured to electrically contact the first electrical contact 270 of the non-nicotine cartridge 100, while the pin 352 is configured to electrically contact the second electrical contact 290 of the non-nicotine cartridge 100. The bayonet adapter 330 may be formed of a conductive material such as steel (e.g., 304 stainless steel). The pin 352 may be covered with gold plating. For instance, the pin 352 may have an interior (underlying structure) formed of brass and an exterior formed of gold (e.g., as a deposited layer).

The knurled connector 340 defines at least one pathway 344 for inflowing air (e.g., air flowing inward and en route to the vaporizing module 200). The at least one pathway 344 in the knurled connector 340 is in fluidic communication with the opening 332 in the bayonet adapter 330. In particular, during vaping, air drawn into the non-nicotine e-vaping device 500 via the air inlets 312 will flow in the annular space between the sleeve section 310 and the non-nicotine cartridge 100 toward the battery section 320 (e.g., in a first longitudinal direction) and then flow inward (e.g., in a radial direction) via the at least one pathway 344 in the knurled connector 340 to the opening 332 in the bayonet adapter 330 before flowing through the opening 332 (e.g., in a second longitudinal direction) to the vaporing module 200. In an example embodiment, the knurled connector 340 may be covered with chrome plating. For instance, the knurled connector 340 may have an interior (underlying structure) formed of brass and an exterior formed of chrome (e.g., as a deposited layer).

Figure 16:
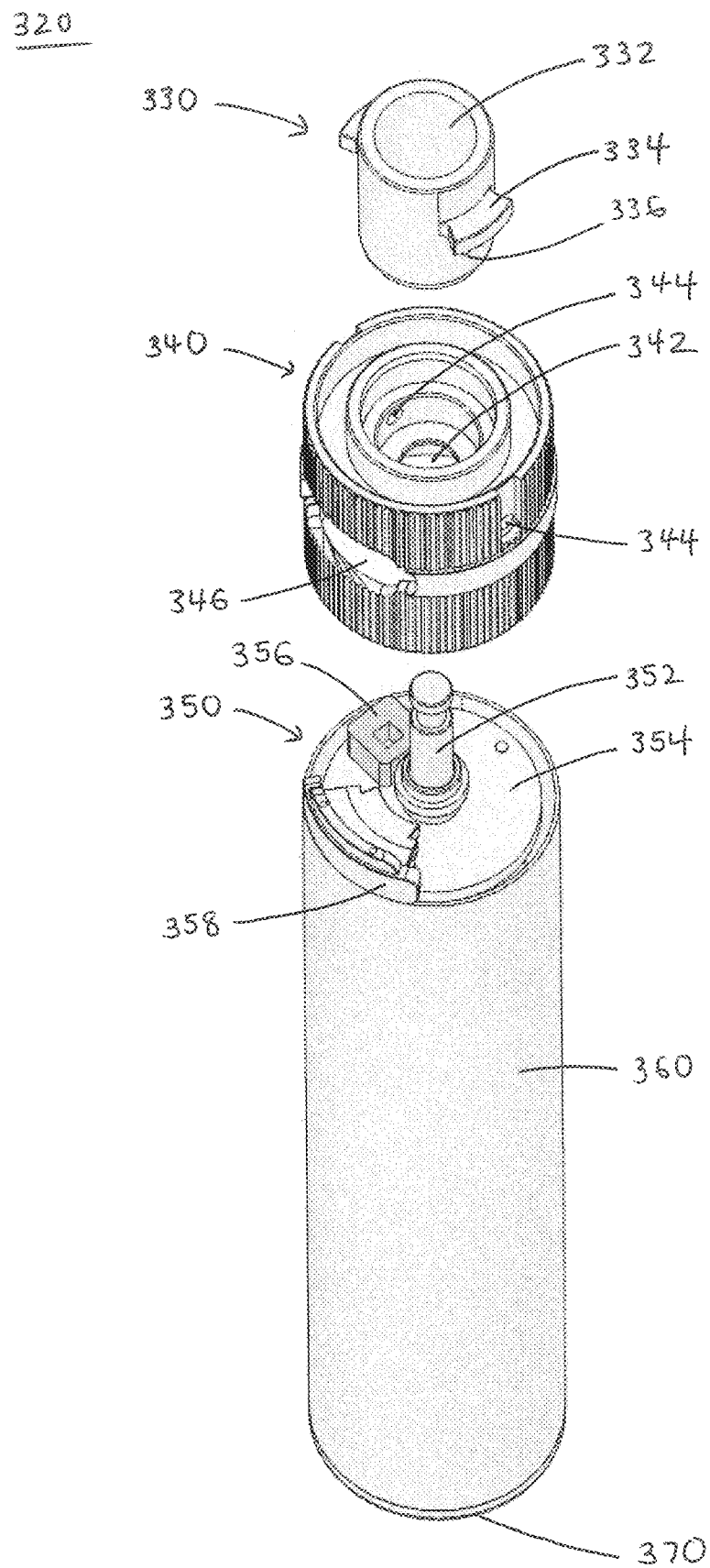
FIG. 16 is a partially-exploded view of the battery section of FIG. 15.

FIG. 16 is a partially-exploded view of the battery section of FIG. 15. Referring to FIG. 16, the dimensions of the engagement members 334 of the bayonet adapter 330 are configured to correspond substantially to the dimensions of the slots 174 in the bayonet connector 170. Additionally, each of the engagement members 334 may include a ridge 336 to help maintain an established bayonet connection (e.g., by interlocking with a corresponding slot 174). For instance, the ridge 336 of each engagement member 334 is configured to seat within a corresponding furrow 174c of each of the slots 174. The ridge 336 may have a linear form that extends radially on the underside of each engagement member 334 (e.g., from the sidewall of the bayonet adapter 330 to the edge of the engagement member 334). Due to the relatively close fit between the engagement members 334 of the bayonet adapter 330 and the slots 174 of the bayonet connector 170, a haptic and/or auditory feedback (e.g., audible click) may be produced to notify an adult vaper that the non-nicotine cartridge 100 has been properly coupled to the device body 300.

The knurled connector 340 is configured to connect/link the sleeve section 310 and the battery section housing 360 of the device body 300. As illustrated, the knurling on the exterior sidewall of the knurled connector 340 may be in the form of two bands separated by an unknurled section in between, wherein the proximal (e.g., upper) band is for engagement with the sleeve section 310, and the distal (e.g., lower) band is for engagement with the battery section housing 360. In an example embodiment, the knurling is obscured from view by the sleeve section 310 and the battery section housing 360 when the device body 300 is assembled. The exterior of the sleeve section 310 and the battery section housing 360 may also be flush with the exposed unknurled section of the knurled connector 340 when the device body 300 is assembled. The knurling may include straight (e.g., longitudinal) ridges. However, it should be understood that other patterns may be suitable. For instance, the knurling may alternatively have an annular pattern, an angled pattern, or a diamond pattern.

As shown in FIG. 16, the knurled connector 340 defines a pair of pathways 344. The pair of pathways 344 may disposed diametrically in the knurled connector 340. As a result, a line extending through the knurled connector 340 via the pathways 344 may intersect a central longitudinal axis of the knurled connector 340 while coinciding with a diameter of the knurled connector 340. Furthermore, the exterior of the knurled connector 340 may be recessed (e.g., to a greater degree than the knurling) from the rim to a region around each pathway 344 to provide an entrance (e.g., cove-like point of ingress) to each pathway 344 when the sleeve section 310 is engaged with the knurled connector 340. In such an instance, the inflowing air during vaping can reach the pathways 344 via these recessed entrances.

The knurled connector 340 also defines an opening 342 and a hole 346 to accommodate parts of the battery subassembly 350. In particular, when the battery section 320 is assembled, the pin 352 will extend through the opening 342 in the knurled connector 340 and into the opening 332 in the bayonet adapter 330. In this assembled state, the proximal end of the pin 352 may be at approximately the same level as the engagement members 334 of the bayonet adapter 330, although example embodiments are not limited thereto. The hole 346 in the knurled connector 340 is configured to expose the light pipe 358. The light pipe 358 may include red, green, and blue (RGB) light-emitting diodes (LED), wherein these primary colors can be combined to produce white light as well as numerous other hues of light. As a result, the emitted light can be transmitted by the light pipe 358 in a manner that would be visible and useful to an adult vaper.

The battery subassembly 350 additionally includes a first printed circuit board (PCB) 354 configured to mechanically support and electrically connect various parts of the battery section 320, including a first sensor 356, the pin 352, and the light pipe 358. In an example embodiment, the first sensor 356 may be a combined pressure sensor and temperature sensor. Additionally, the pin 352 may be a pogo pin or spring-loaded pin. The light pipe 358 may include five light-emitting diodes, although it should be understood that a different number may be implemented. The light pipe 358 may be utilized to communicate a variety of types of information to an adult vaper.

For instance, with regard to battery level, an illumination of all five lights by the light pipe 358 may indicate a full battery level, while an illumination of fewer lights, such as three lights, may indicate a medium battery level. On the other hand, an illumination of only one light may indicate a low battery level. The color of the light(s) may also change (e.g., change to a warning color such as red) to enhance the recognition of a given indication. Furthermore, the light(s) may blink to help indicate the urgency of a particular indication. The desired type of information or function may be accessed by pressing the button 372 (FIG. 5) at the distal end of the non-nicotine e-vaping device 500. In an example embodiment, pressing the button 372 once may display the battery level (e.g., for 5 seconds). In another instance, successively pressing the button 372 in a short period of time may result in a different function or display. Specifically, successively pressing the button 372 five times may turn on/off the non-nicotine e-vaping device 500. Thus, the non-nicotine e-vaping device 500 may be puff-activated and/or button-activated.

Figure 17:
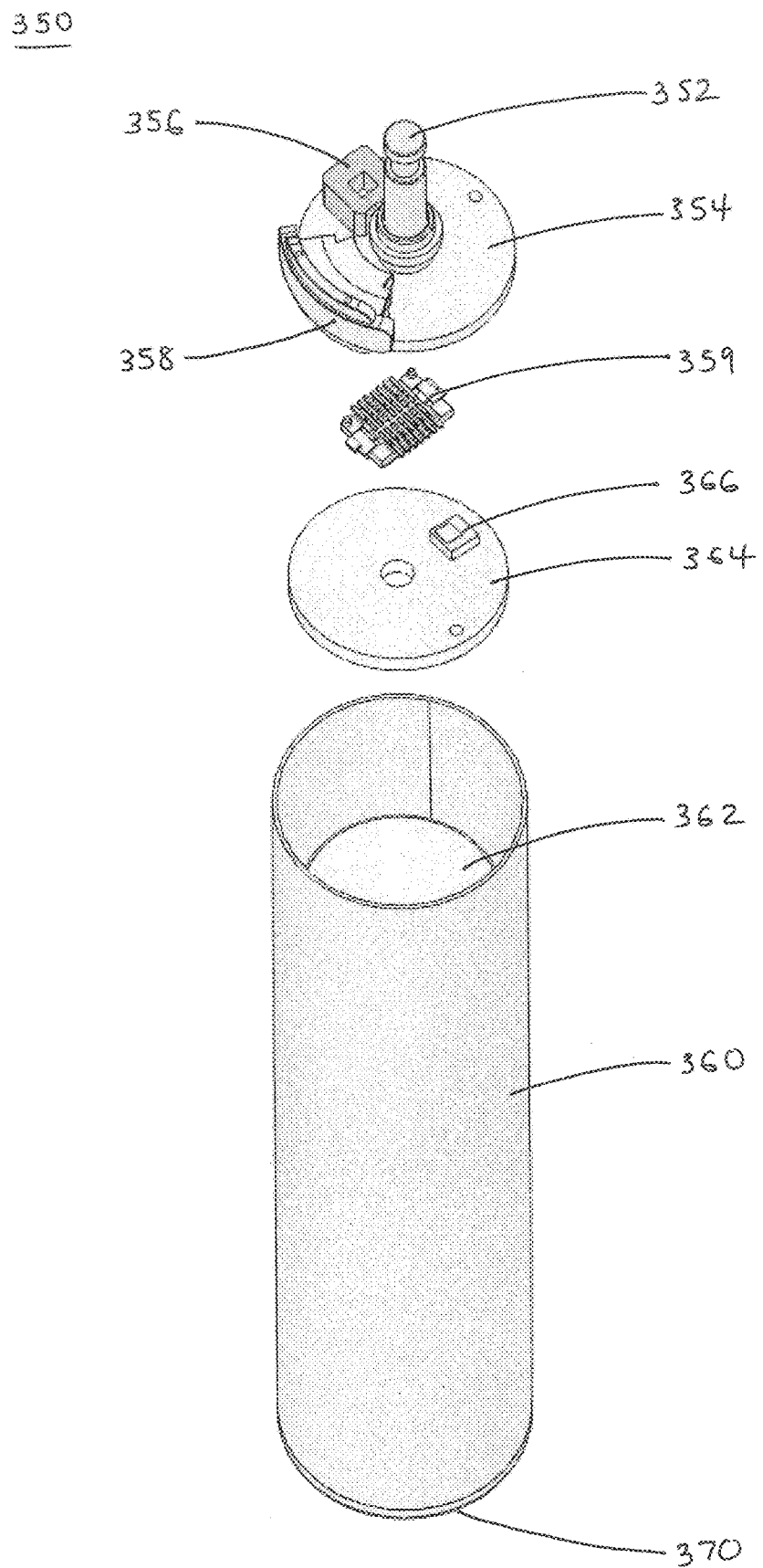
FIG. 17 is a partially-exploded view of the battery subassembly in FIG. 16.

FIG. 17 is a partially-exploded view of the battery subassembly in FIG. 16. Referring to FIG. 17, the battery subassembly 350 also includes a second printed circuit board (PCB) 364 configured to mechanically support and electrically connect at least a second sensor 366. The second sensor 366 may be a temperature sensor (e.g., second temperature sensor). The battery subassembly 350 further includes a controller 359 which may be mechanically supported and electrically connected by the first printed circuit board 354 and/or the second printed circuit board 364. A power supply 362 is disposed within the battery section housing 360. The power supply 362 may be a rechargeable battery configured to supply an electric current to the integral heater-thermocouple 250 of the non-nicotine cartridge 100 in response to a puff-activation or a button-activation.

At least one of the first sensor 356 or the second sensor 366 may be configured to measure a voltage difference between the first segment 252 and the second segment 256 of the integral heater-thermocouple 250 as a result of the supply of the electrical energy from the power supply 362 (e.g., when the non-nicotine pre-vapor formulation 180 is being heated to generate a non-nicotine vapor). When both the first sensor 356 and the second sensor 366 are used to measure the voltage, the measured values may be averaged to obtain an average value. The controller 359 may be configured to adjust the supply of the electrical energy to the integral heater-thermocouple 250 based on the voltage difference measured by at least one of the first sensor 356 or the second sensor 366. In an example embodiment, the controller 359 is configured to look up a temperature of the integral heater-thermocouple 250 based on the voltage difference and to cease the supply of the electrical energy when the temperature exceeds an upper threshold value.

Because the measured voltage at the junction 254 of the integral heater-thermocouple 250 is temperature-dependent, the relationship between voltage and temperature may be determined from empirical studies and organized/stored in a lookup table (LUT). In such an instance, during vaping, the measured voltage can be used by the controller 359 to access the temperature at the junction 254 of the integral heater-thermocouple 250 from the lookup table (which may be stored in the controller 359 or in a separate memory). If the temperature is determined by the controller 359 to exceed an upper threshold value, then an adjustment may be made by the controller 359 to scale down the duty cycle (e.g., duty cycle of 50% scaled down to 25%). On the other hand, if the temperature is determined by the controller 359 to be below a lower threshold value, then an adjustment may be made by the controller 359 to scale up the duty cycle (e.g., duty cycle of 50% scaled up to 75%). Such temperature control may be operated in a closed loop. In an alternative embodiment, the relationship between voltage and temperature may be represented as an equation and calculated instead of accessed from a LUT.

Figure 18:
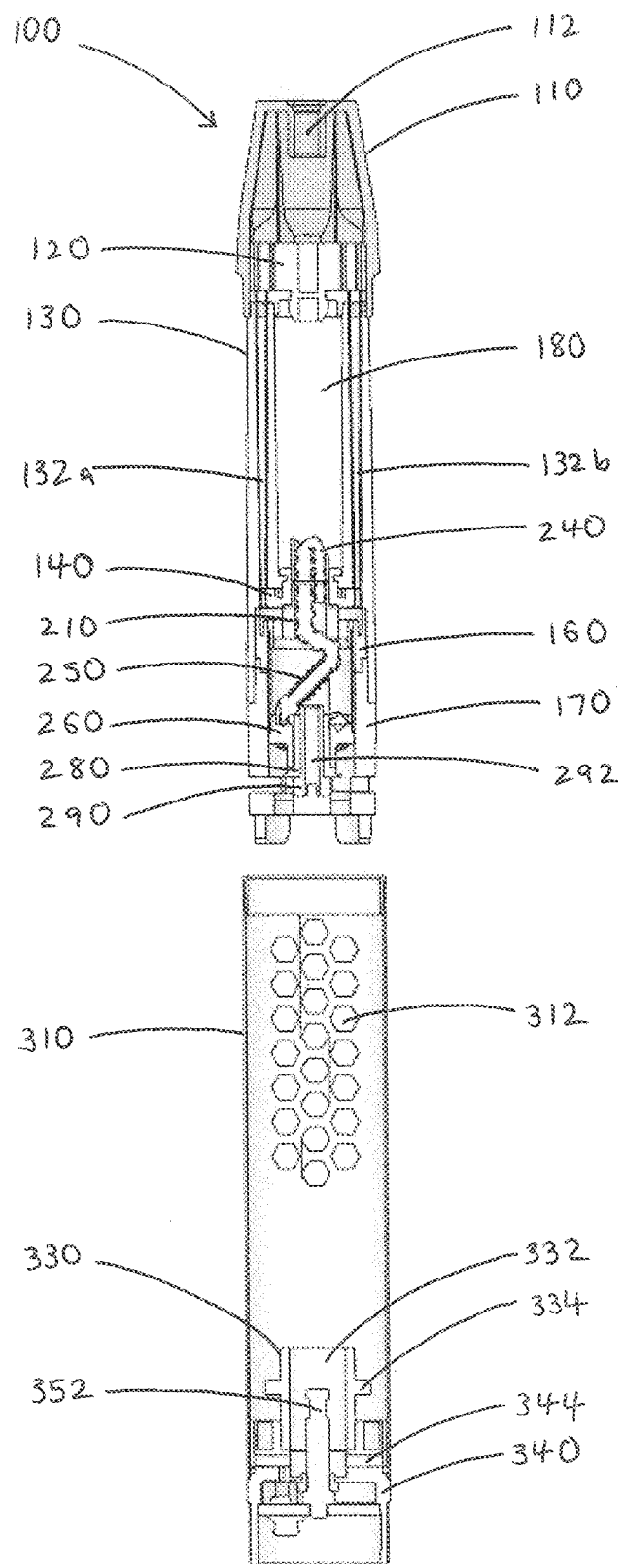
FIG. 18 is a cross-sectional view of the non-nicotine cartridge and a partial cross-sectional view of the device body of FIG. 6 when not engaged.

FIG. 18 is a cross-sectional view of the non-nicotine cartridge and a partial cross-sectional view of the device body of FIG. 6 when not engaged. Referring to FIG. 18, the non-nicotine cartridge 100 is configured for insertion into the sleeve section 310 of the device body 300 such the slots 174 (FIG. 8) of the bayonet connector 170 initially mate with the engagement members 334 of the bayonet adapter 330. In particular, the longitudinal portion 174a (FIG. 9) of each slot 174 is configured to receive a corresponding engagement member 334 until the engagement member 334 abuts the end surface of the longitudinal portion 174a. Once this initial mating occurs, the non-nicotine cartridge 100 can then be turned/twisted/rotated (e.g., clockwise) relative to the device body 300 such that the engagement members 334 slide circumferentially within the corresponding circumferential portions 174b of the slots 174 until the ridges 336 (FIG. 16) of the engagement members 334 are resiliently seated within the furrows 174c (FIG. 8) of the slots 174, thereby resulting in the non-nicotine cartridge 100 being mechanically interlocked with the device body 300.

With regard to electrical engagement, the first segment 252 (FIG. 12) of the integral heater-thermocouple 250 of the non-nicotine cartridge 100 may be electrically connected, inter alia, to the bayonet adapter 330 of the device body 300, while the second segment 256 (FIG. 12) of the integral heater-thermocouple 250 of the non-nicotine cartridge 100 may be electrically connected to, inter alia, the pin 352 of the device body 300. In turn, the bayonet adapter 330 of the device body 300 may be electrically connected to the negative terminal of the power supply 362, while the pin 352 of the device body 300 may be electrically connected to the positive terminal of the power supply 362. The electrical paths from the terminals of the power supply 362 to the integral heater-thermocouple 250 will be discussed in more detail herein.

When engaged (mechanically and electrically) with the device body 300, the non-nicotine cartridge 100 may be substantially obscured from view with the exception of the mouthpiece 110. With regard to this substantial obscurity, portions of the tank 130, the non-nicotine pre-vapor formulation 180, and the vaporizer 150 may be partly visible through the air inlets 312 in the sleeve section 310 of the device body 300. As a result, when adequate ambient light is present, the level of the non-nicotine pre-vapor formulation 180 within the non-nicotine cartridge 100 may be visually gauged by an adult vaper. In contrast, when ambient light is not present or not adequate, then the adult vaper may rely on a notification from the light pipe 358 that the non-nicotine pre-vapor formulation 180 within the non-nicotine cartridge 100 is low and/or depleted.

The removal of the non-nicotine cartridge 100 can be achieved by reversing the motions associated with engagement, such as turning the non-nicotine cartridge 100 in the opposite direction (e.g., counterclockwise) and pulling the non-nicotine cartridge 100 away from the device body 300. Because the engagement members 334 of the bayonet adapter 330 are resiliently seated within the furrows 174c of the slots 174, the force required to untwist and disengage the non-nicotine cartridge 100 may be greater than the force used to twist and engage the non-nicotine cartridge 100, which may help to ensure that the disengagement of the non-nicotine cartridge 100 from the device body 300 is a deliberate action rather than an unintentional occurrence. Furthermore, in the interest of brevity, it should be understood that not all of the labeled parts of FIG. 18 were specifically mentioned in connection with this section, because such parts were already discussed supra and did not merit further repetition or discussion.

Figure 19:
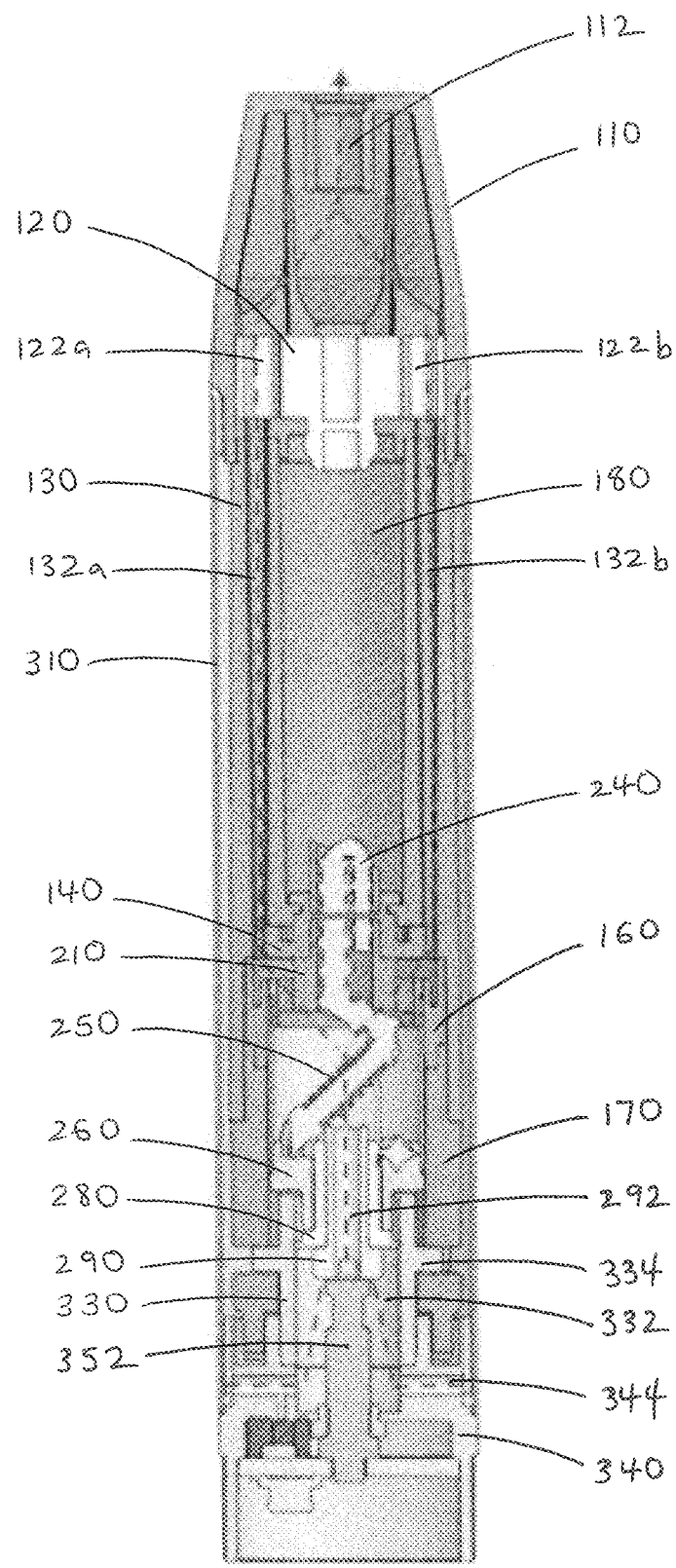
FIG. 19 is a cross-sectional view of the non-nicotine cartridge and a partial cross-sectional view of the device body of FIG. 18 when engaged.

FIG. 19 is a cross-sectional view of the non-nicotine cartridge and a partial cross-sectional view of the device body of FIG. 18 when engaged. Referring to FIG. 19, the flow of air to the integral heater-thermocouple 250 and the flow of generated vapor therefrom are shown with dashed lines. In particular, upon the application of a negative pressure to the mouthpiece 110 of the non-nicotine e-vaping device 500, air is drawn into the air inlets 312 (FIG. 1) in the sleeve section 310 and through an annular space between the sleeve section 310 and the non-nicotine cartridge 100 in a direction toward the knurled connector 340. Next, the air flows toward and through the pathways 344 in the knurled connector 340. The flow of air within the annular space toward the pathways 344 in the knurled connector 340 may include a circumferential flow (e.g., from the annular space in front of the non-nicotine cartridge 100 around to the side or from the annular space behind the non-nicotine cartridge 100 around to the side). The flow of air through the pathways 344 in the knurled connector 340 is in an inward direction (e.g., radial direction toward the central longitudinal axis of the non-nicotine e-vaping device 500).

Upon passing through the pathways 344 in the knurled connector 340, the streams of air then flow to the second electrical contact 290 and enter the passage 292 through the second electrical contact 290 via the grooves 298 (FIG. 13) in the base portion 296 of the second electrical contact 290. The streams of air also converge when flowing through the passage 292 in the second electrical contact 290.

The air exiting the passage 292 in the second electrical contact 290 flows through/past the integral heater-thermocouple 250 (e.g., which was puff-activated) and the wick 240 to entrain the generated non-nicotine vapor. Afterwards, the entrained non-nicotine vapor passes through the apertures 218 (FIG. 10) in the first module cover 210. In an example embodiment, the passage of the non-nicotine vapor through the first module cover 210 may split the vapor into eight streams as a result of the eight apertures 218 (FIG. 10). The split non-nicotine vapor then consolidates into two streams which flow through the vapor channels 132a and 132b in the tank 130 and also through the apertures 122a and 122b in the first seal 120 (FIG. 7). After flowing through the first seal 120, the two streams of non-nicotine vapor converge into one stream to exit through the vapor outlet 112 of the mouthpiece 110. However, it should be understood that example embodiments are not limited thereto. For instance, as noted supra, the mouthpiece 110 may have different configurations for the vapor outlet 112, thus allowing for other variations as to the exiting non-nicotine vapor flow.

Figure 20:
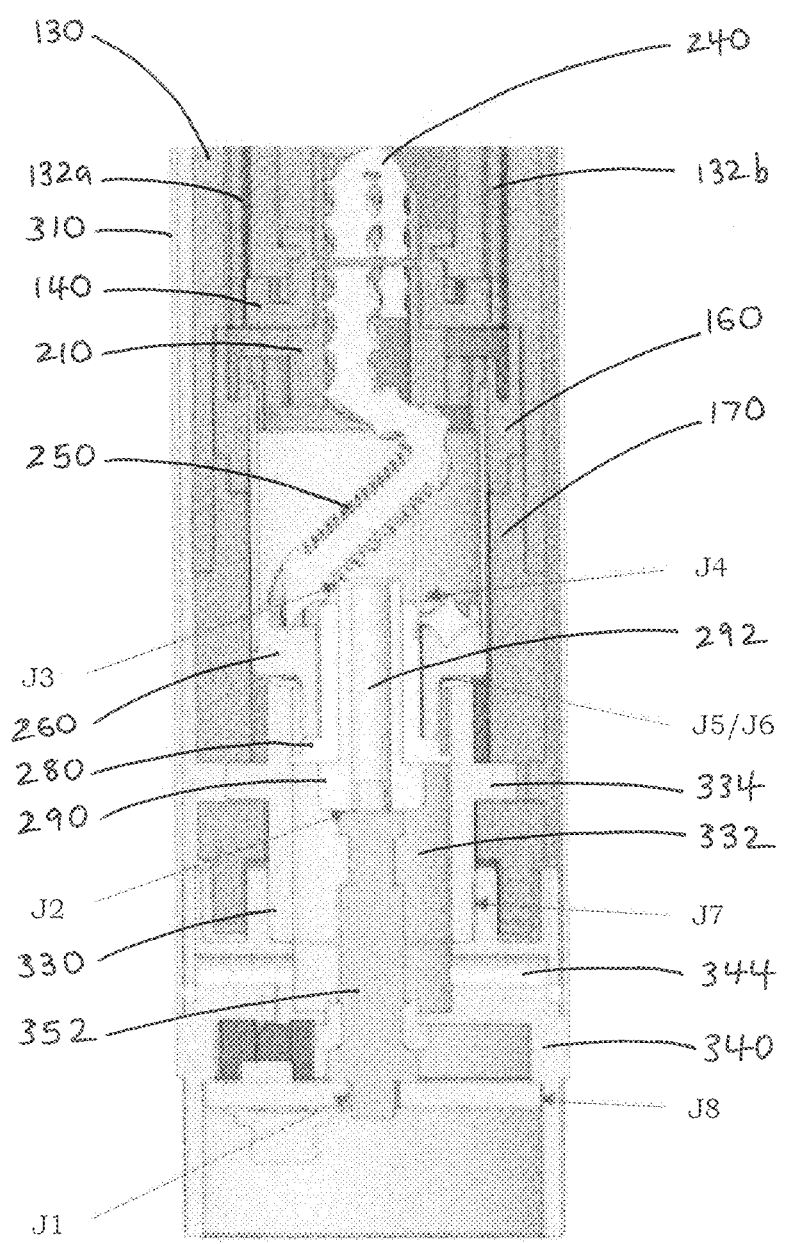
FIG. 20 is an enlarged view of the cross-section of FIG. 19.

FIG. 20 is an enlarged view of the cross-section of FIG. 19. Referring to FIG. 20, the electrical paths from the terminals of the power supply 362 (FIG. 17) to the integral heater-thermocouple 250 includes a plurality of electrical junctions (J1-J8). J1 is an electrical junction of the printed circuit board (e.g., copper of first printed circuit board 354) and the pin 352 (e.g., gold-plated brass). J2 is an electrical junction of the pin 352 (e.g., gold-plated brass) and the second electrical contact 290 (e.g., gold-plated brass). J3 is an electrical junction of the second electrical contact 290 (e.g., gold-plated brass) and the second segment 256 (e.g., nickel-chromium alloy) of the integral heater-thermocouple 250. J4 is an electrical junction of the first segment 252 (e.g., nickel-aluminum alloy) of the integral heater-thermocouple 250 and the second module cover 260 (e.g., stainless steel). J5 is an electrical junction of the second module cover 260 (e.g., stainless steel) and the first electrical contact 270 (e.g., gold-plated steel). J6 is an electrical junction of the first electrical contact 270 (e.g., gold-plated steel) and the bayonet adapter 330 (e.g., stainless steel). J7 is an electrical junction of the bayonet adapter 330 (e.g., stainless steel) and the knurled connector 340 (e.g., chrome-plated brass). J8 is an electrical junction of the knurled connector 340 (e.g., chrome-plated brass) and the printed circuit board (e.g., copper of first printed circuit board 354).

Thus, when the non-nicotine e-vaping device 500 is activated (e.g., puff-activated), an electric current may be regarded as flowing from the positive terminal of the power supply 362 to the printed circuit board 354, from the printed circuit board 354 to the pin 352, from the pin 352 to the second electrical contact 290, from the second electrical contact 290 to the second segment 256 of the integral heater-thermocouple 250, from the second segment 256 to the first segment 252 of the integral heater-thermocouple 250, from the first segment 252 of the integral heater-thermocouple 250 to the second module cover 260, from the second module cover 260 to the first electrical contact 270, from the first electrical contact 270 to the bayonet adapter 330, from the bayonet adapter 330 to the knurled connector 340, from the knurled connector 340 to the printed circuit board 354, and from the printed circuit board 354 to the negative terminal of the power supply 362. It should be understood that the requisite circuits in the non-nicotine e-vaping device 500 are connected to the power supply 362, although such connections are not necessarily illustrated in the drawings.

The electrical junctions (J1-J8) discussed above may be taken into account by the controller 359 when determining the temperature at the junction 254 of the integral heater-thermocouple 250. Based on the known materials of electrical junctions (J1-J8), empirical studies can be conducted to generate a calibration curve that covers an expected operating temperature range of the integral heater-thermocouple 250. As a result, a factor or correction can be applied to an initial temperature determination by the controller 359 so as to achieve a corrected temperature that takes into account the electrical junctions (J1-J8) connected to the integral heater-thermocouple 250.

In an example embodiment, the non-nicotine pre-vapor formulation neither includes tobacco nor is derived from tobacco. A non-nicotine compound of the non-nicotine pre-vapor formulation may be part of, or included in a liquid or a partial-liquid that includes an extract, an oil, an alcohol, a tincture, a suspension, a dispersion, a colloid, a general non-neutral (slightly acidic or slightly basic) solution, or combinations thereof. During the preparation of the non-nicotine pre-vapor formulation, the non-nicotine compound may be infused into, comingled, or otherwise combined with the other ingredients of the non-nicotine pre-vapor formulation.

In an example embodiment, the non-nicotine compound undergoes a slow, natural decarboxylation process over an extended duration of time at relatively low temperatures, including at or below room temperature (e.g., 72° F.). In addition, the non-nicotine compound may undergo a significantly elevated decarboxylation process (e.g., 50% decarboxylation or greater) if exposed to elevated temperatures, especially in the range of about 175° F. or greater over a period of time (minutes or hours) at a relatively low pressure such as 1 atmosphere. Higher temperatures of about 240° F. or greater can cause a rapid or instantaneous decarboxylation to occur at a relatively high decarboxylation rate, although further elevated temperatures can cause a degradation of some or all of the chemical properties of the non-nicotine compound(s).

In an example embodiment, the non-nicotine compound may be from a medicinal plant (e.g., a naturally-occurring constituent of a plant that provides a medically-accepted therapeutic effect). The medicinal plant may be a *cannabis* plant, and the constituent may be at least one *cannabis*-derived constituent. Cannabinoids (e.g., phytocannabinoids) and terpenes are examples of *cannabis*-derived constituents. Cannabinoids interact with receptors in the body to produce a wide range of effects. As a result, cannabinoids have been used for a variety of medicinal purposes. *Cannabis*-derived materials may include the leaf and/or flower material from one or more species of *cannabis* plants, or extracts from the one or more species of *cannabis* plants. For instance, the one or more species of *cannabis* plants may include *Cannabis sativa, Cannabis indica*, and *Cannabis ruderalis*. In some example embodiments, the non-nicotine pre-vapor formulation includes a mixture of *cannabis* and/or *cannabis*-derived constituents that are, or are derived from, 60-80% (e.g., 70%) *Cannabis sativa* and 20-40% (e.g., 30%) *Cannabis indica*.

Non-limiting examples of *cannabis*-derived cannabinoids include tetrahydrocannabinolic acid (THCA), tetrahydrocannabinol (THC), cannabidiolic acid (CBDA), cannabidiol (CBD), cannabinol (CBN), cannabicyclol (CBL), cannabichromene (CBC), and cannabigerol (CBG). Tetrahydrocannabinolic acid (THCA) is a precursor of tetrahydrocannabinol (TI-IC), while cannabidiolic, acid (CBDA) is precursor of cannabidiol (CBD). Tetrahydrocannabinolic acid (THCA) and cannabidiolic acid (CBDA) may be converted to tetrahydrocannabinol (THC) and cannabidiol (CBD), respectively, via heating. In an example embodiment, heat from the heater may cause decarboxylation to convert tetrahydrocannabinolic acid (THCA) in the non-nicotine pre-vapor formulation to tetrahydrocannabinol (THC), and/or to convert cannabidiolic acid (CBDA) in the non-nicotine pre-vapor formulation to cannabidiol (CBD).

In instances where both tetrahydrocannabinolic acid (THCA) and tetrahydrocannabinol (THC) are present in the non-nicotine pre-vapor formulation, the decarboxylation and resulting conversion will cause a decrease in tetrahydrocannabinolic acid (THCA) and an increase in tetrahydrocannabinol (THC). At least 50% (e.g., at least 87%) of the tetrahydrocannabinolic acid (THCA) may be converted to tetrahydrocannabinol (THC), via the decarboxylation process, during the heating of the non-nicotine pre-vapor formulation for purposes of vaporization. Similarly, in instances where both cannabidiolic acid (CBDA) and cannabidiol (CBD) are present in the non-nicotine pre-vapor formulation, the decarboxylation and resulting conversion will cause a decrease in cannabidiolic acid (CBDA) and an increase in cannabidiol (CBD). At least 50% (e.g., at least 87%) of the cannabidiolic, acid (CBDA) may be converted to cannabidiol (CBD), via the decarboxylation process, during the heating of the non-nicotine pre-vapor formulation for purposes of vaporization.

The non-nicotine pre-vapor formulation may contain the non-nicotine compound that provides the medically-accepted therapeutic effect (e.g., treatment of pain, nausea, epilepsy, psychiatric disorders). Details on methods of treatment may be found in U.S. application Ser. No. 15/845,501, filed Dec. 18, 2017, titled "VAPORIZING DEVICES AND METHODS FOR DELIVERING A COMPOUND USING THE SAME," the disclosure of which is incorporated herein in its entirety by reference.

In an example embodiment, at least one flavorant is present in an amount ranging from about 0.2% to about 15% by weight (e.g., about 1% to 12%, about 2% to 10%, or about 5% to 8%) based on a total weight of the non-nicotine pre-vapor formulation. The at least one flavorant may be at least one of a natural flavorant, an artificial flavorant, or a combination of a natural flavorant and an artificial flavorant. The at least one flavorant may include volatile *cannabis* flavor compounds (flavonoids) or other flavor compounds instead of, or in addition to, the *cannabis* flavor compounds. For instance, the at least one flavorant may include menthol, wintergreen, peppermint, cinnamon, clove, combinations thereof, and/or extracts thereof. In addition, flavorants may be included to provide other herb flavors, fruit flavors, nut flavors, liquor flavors, roasted flavors, minty flavors, savory flavors, combinations thereof, and any other desired flavors.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A non-nicotine cartridge for a non-nicotine e-vaping device, comprising:
a housing defining a reservoir containing a non-nicotine pre-vapor formulation;
a wick configured to transport the non-nicotine pre-vapor formulation by capillary action;
an integral heater-thermocouple configured to heat the non-nicotine pre-vapor formulation in the wick to generate a non-nicotine vapor, the integral heater-thermocouple including a first segment made of a first alloy and a second segment made of a second alloy, the first segment being downstream from the second segment;
a first vapor channel; and
a second vapor channel, the first vapor channel and the second vapor channel spaced apart by the reservoir,
wherein the housing has a first longitudinal axis, and the integral heater-thermocouple has a second longitudinal axis that intersects the first longitudinal axis to form an oblique angle.

2. The non-nicotine cartridge of claim 1, wherein the housing includes a sidewall, the sidewall of the housing defining the first vapor channel and the second vapor channel extending therethrough and along the first longitudinal axis of the housing.

3. The non-nicotine cartridge of claim 1, wherein the integral heater-thermocouple has a Seebeck coefficient of about 35 to 75 µV/° C.

4. The non-nicotine cartridge of claim 1, wherein the integral heater-thermocouple has an overall resistance of about 0.5 to 3.5 Ω.

5. The non-nicotine cartridge of claim 1, wherein the integral heater-thermocouple is in a form of a helical structure wrapped around the wick, the helical structure including a plurality of coils, the plurality of coils including at least one coil of the first alloy and at least one coil of the second alloy.

6. The non-nicotine cartridge of claim 5, wherein the at least one coil of the first alloy is welded to the at least one coil of the second alloy at a junction.

7. The non-nicotine cartridge of claim 5, wherein the plurality of coils is in a form of five to ten coils.

8. The non-nicotine cartridge of claim 7, wherein the plurality of coils includes one coil of the first alloy and five coils of the second alloy.

9. The non-nicotine cartridge of claim 7, wherein the plurality of coils includes two coils of the first alloy and four coils of the second alloy.

10. The non-nicotine cartridge of claim 1, wherein the first alloy has a first electrical resistivity and a first thermal conductivity, the second alloy has a second electrical resistivity and a second thermal conductivity, the first electrical resistivity is less than the second electrical resistivity, and the first thermal conductivity is greater than the second thermal conductivity.

11. The non-nicotine cartridge of claim 1, wherein the first alloy is a nickel-aluminum alloy, and the second alloy is a nickel-chromium alloy.

12. The non-nicotine cartridge of claim 11, wherein the nickel-aluminum alloy includes 95% nickel and 2% aluminum.

13. The non-nicotine cartridge of claim 11, wherein the nickel-chromium alloy includes 90% nickel and 10% chromium.

14. A non-nicotine e-vaping device comprising:
a non-nicotine cartridge including a non-nicotine pre-vapor formulation, a wick, an integral heater-thermocouple, a reservoir, a first vapor channel, and a second vapor channel, the wick configured to transport the non-nicotine pre-vapor formulation by capillary action, the integral heater-thermocouple including a first segment made of a first alloy and a second segment made of a second alloy, the first segment being downstream from the second segment, the first vapor channel and the second vapor channel being spaced apart by the reservoir; and
a device body configured to receive the non-nicotine cartridge, the device body including a power supply, at least one sensor, and a controller, the power supply configured to deliver a supply of electrical energy to the integral heater-thermocouple to heat the non-nicotine pre-vapor formulation in the wick to generate a non-nicotine vapor, the at least one sensor configured to measure a voltage difference between the first segment and the second segment of the integral heater-thermocouple as a result of the supply of the electrical energy from the power supply, the controller configured to adjust the supply of the electrical energy to the integral heater-thermocouple based on the voltage difference measured by the at least one sensor,
wherein the device body has a first longitudinal axis, and the integral heater-thermocouple has a second longitudinal axis that intersects the first longitudinal axis to form an oblique angle.

15. The non-nicotine e-vaping device of claim 14, wherein the controller is configured to calculate a temperature of the integral heater-thermocouple based on the voltage difference and to cease the supply of the electrical energy when the temperature exceeds an upper threshold value.

16. The non-nicotine e-vaping device of claim 14, wherein the device body further includes a sleeve section configured to receive the non-nicotine cartridge, the sleeve section defining an array of inlet openings.

17. The non-nicotine e-vaping device of claim 16, wherein the array of inlet openings are in a form of a honeycomb pattern configured to facilitate an intake of ambient air which enters the device body and travels toward the power supply before moving inward and then toward the integral heater-thermocouple.

* * * * *